United States Patent
Fujimura et al.

(10) Patent No.: US 9,821,501 B2
(45) Date of Patent: Nov. 21, 2017

(54) PRODUCTION METHOD OF DEFORMED POROUS HOLLOW FIBER MEMBRANE

(71) Applicant: ASAHI KASEI CHEMICALS CORPORATION, Tokyo (JP)

(72) Inventors: Hirokazu Fujimura, Tokyo (JP); Masatoshi Hashino, Tokyo (JP); Noboru Kubota, Tokyo (JP); Hideto Matsuyama, Hyogo (JP)

(73) Assignee: ASAHI KASEI CHEMICALS CORPORATION, Tokyo (JP)

( * ) Notice: Subject to any disclaimer, the term of this patent is extended or adjusted under 35 U.S.C. 154(b) by 220 days.

(21) Appl. No.: 14/602,368

(22) Filed: Jan. 22, 2015

(65) Prior Publication Data

US 2015/0174809 A1 Jun. 25, 2015

Related U.S. Application Data

(62) Division of application No. 13/382,039, filed as application No. PCT/JP2010/063772 on Aug. 13, 2010.

(30) Foreign Application Priority Data

Apr. 16, 2010 (JP) .................................. 2010-095200

(51) Int. Cl.
*B01D 69/08* (2006.01)
*B01D 71/28* (2006.01)
(Continued)

(52) U.S. Cl.
CPC ...... *B29C 47/0023* (2013.01); *B01D 67/0002* (2013.01); *B01D 69/08* (2013.01);
(Continued)

(58) Field of Classification Search
None
See application file for complete search history.

(56) References Cited

U.S. PATENT DOCUMENTS

2003/0107150 A1 6/2003 Hamanaka et al.
2003/0140790 A1 7/2003 Herczeg
(Continued)

FOREIGN PATENT DOCUMENTS

CN 101282780 10/2008
FR 2395481 1/1979
(Continued)

OTHER PUBLICATIONS

U.S. Appl. No. 29/391,427 to Hirokazu Fujimura et al., filed May 9, 2011.
(Continued)

*Primary Examiner* — Krishnan S Menon
(74) *Attorney, Agent, or Firm* — Greenblum & Bernstein, P.L.C.

(57) ABSTRACT

Methods of producing a deformed porous hollow fiber membrane by thermally induced phase separation, particularly by discharging a fusion kneaded product containing a thermoplastic resin and an organic liquid through an orifice of a hollow fiber-forming deformed nozzle; cooling and solidifying the fusion kneaded product discharged through the deformed nozzle to form the product into a hollow fiber-like material having a deformed cross section at a cross section vertical to a discharging direction; and extracting away the organic liquid from the hollow fiber-like material to obtain the deformed porous hollow fiber membrane, wherein an inorganic fine powder is kneaded in the fusion kneaded product.

15 Claims, 25 Drawing Sheets

(51) Int. Cl.
  *B01D 71/34* (2006.01)
  *B01D 67/00* (2006.01)
  *B29C 47/00* (2006.01)
  *B01D 71/26* (2006.01)
  *B29K 27/00* (2006.01)
  *B29L 23/00* (2006.01)

(52) U.S. Cl.
  CPC ......... *B01D 69/082* (2013.01); *B01D 69/085* (2013.01); *B01D 69/087* (2013.01); *B01D 71/26* (2013.01); *B01D 71/34* (2013.01); *B01D 2313/10* (2013.01); *B01D 2313/26* (2013.01); *B01D 2323/02* (2013.01); *B01D 2323/08* (2013.01); *B01D 2323/42* (2013.01); *B29K 2027/16* (2013.01); *B29L 2023/003* (2013.01)

(56) References Cited

U.S. PATENT DOCUMENTS

| | | |
|---|---|---|
| 2004/0045893 A1 | 3/2004 | Watanabe et al. |
| 2009/0297822 A1 | 12/2009 | Fujimura et al. |
| 2010/0155334 A1 | 6/2010 | Taniguchi et al. |
| 2011/0062074 A1 | 3/2011 | Ishibashi et al. |
| 2011/0132830 A1 | 6/2011 | Nejigaki et al. |

FOREIGN PATENT DOCUMENTS

| | | |
|---|---|---|
| JP | 57-194007 | 11/1982 |
| JP | 58-169510 | 10/1983 |
| JP | 60-19002 | 1/1985 |
| JP | 61-120606 | 6/1986 |
| JP | 03-293022 | 12/1991 |
| JP | 06-246140 | 9/1994 |
| JP | 6-509746 | 11/1994 |
| JP | 7-171360 | 7/1995 |
| JP | 2000-317277 | 11/2000 |
| JP | 2002-70115 | 3/2002 |
| JP | 2007-43553 | 2/2007 |
| JP | 2008-93503 | 4/2008 |
| JP | 2010-188253 | 9/2010 |
| WO | 02/070115 | 9/2002 |
| WO | 2007/043553 | 4/2007 |
| WO | 2008/062788 | 5/2008 |

OTHER PUBLICATIONS

Search report from International Application No. PCT/JP2010/063772, dated Nov. 22, 2010.

International Preliminary Report on Patentability issued with respect to counterpart International Application No. PCT/JP2010/063772, dated Nov. 15, 2012.

European Search Report issued with respect to counterpart European Application No. 10849860.1, dated Jan. 28, 2013.

Office Action issued with respect to chinese Application No. 201080046485.8, dated May 6, 2014.

Japanese Office Action issued with respect to Japanese Application No. 2011-513789, dated Apr. 15, 2014.

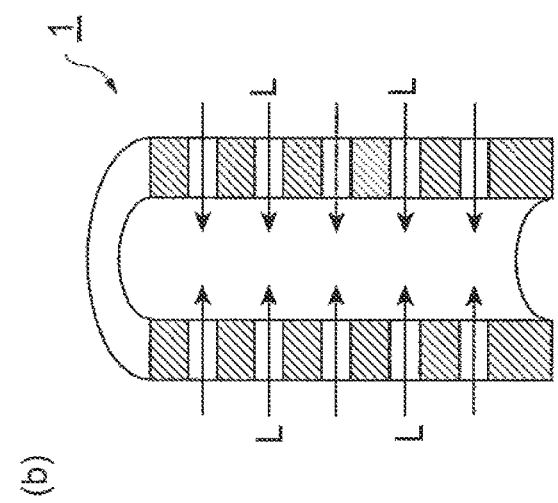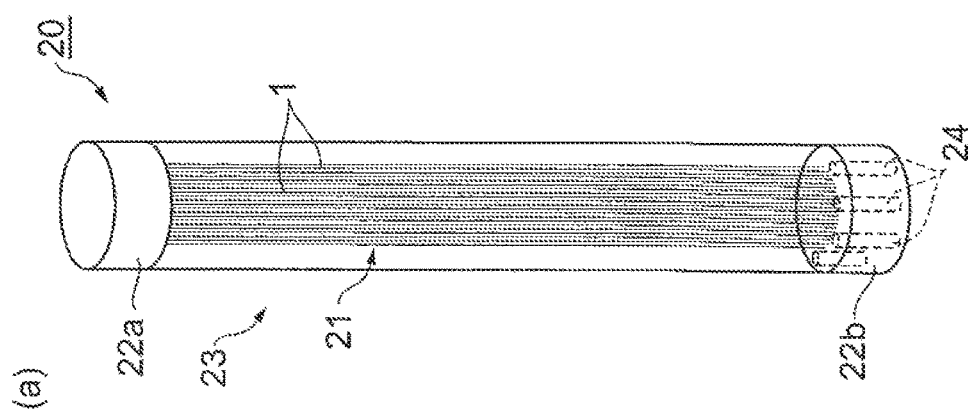
Fig. 9

| | | | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| Composition ratio | Thermoplastic resin | R-1 | 34.0 | 34.0 | 34.0 | 34.0 | 34.0 | 34.0 | 34.0 | 34.0 |
| | | R-2 | — | — | — | — | — | — | — | — |
| | | R-3 | — | — | — | — | — | — | — | — |
| | | R-4 | — | — | — | — | — | — | — | — |
| | Organic liquid | L-1 | 33.8 | 33.8 | 33.8 | 33.8 | 33.8 | 33.8 | 33.8 | 33.8 |
| | | L-2 | 6.8 | 6.8 | 6.8 | 6.8 | 6.8 | 6.8 | 6.8 | 6.8 |
| | | L-3 | — | — | — | — | — | — | — | — |
| | | L-4 | — | — | — | — | — | — | — | — |
| | Inorganic fine powder | P-1 | 25.4 | 25.4 | 25.4 | 25.4 | 25.4 | 25.4 | 25.4 | 25.4 |
| | Hydrophilic additive | P-2 | — | — | — | — | — | — | — | — |
| Outlet size | Height of asperity [$\mu$m] | | 200 | 200 | 200 | 200 | 200 | 200 | 200 | 200 |
| | Width of asperity [$\mu$m] | | 400 | 400 | 400 | 400 | 400 | 400 | 400 | 400 |
| | Number of asperities [number] | | 16 | 16 | 16 | 16 | 16 | 16 | 16 | 16 |
| | Outer diameter of depressed part [mm] | | 1.72 | 1.72 | 1.72 | 1.72 | 1.72 | 1.72 | 1.72 | 1.72 |
| | Inner diameter [mm] | | 0.92 | 0.92 | 0.92 | 0.92 | 0.92 | 0.92 | 0.92 | 0.92 |
| | Cross-sectional area of outlet [mm$^2$] | | 2.66 | 2.66 | 2.66 | 2.66 | 2.66 | 2.66 | 2.66 | 2.66 |
| | Peripheral length of outlet [mm] | | 12.9 | 12.9 | 12.9 | 12.9 | 12.9 | 12.9 | 12.9 | 12.9 |
| | Equivalent radius [mm] | | 0.41 | 0.41 | 0.41 | 0.41 | 0.41 | 0.41 | 0.41 | 0.41 |
| Condition for forming membrane | Airflow time [sec] | | 0.60 | 0.60 | 0.60 | 0.60 | 0.60 | 0.60 | 0.60 | 0.60 |
| | Discharge amount of fusion kneaded product [mm$^3$/sec] | | 521 | 42 | 71 | 147 | 240 | 325 | 789 | 1042 |
| | Linear speed $V_s$ on discharge [mm/sec] | | 196 | 16 | 26 | 55 | 90 | 122 | 296 | 391 |
| | Take-up speed $V_L$ [m/min] | | 30 | 3 | 5 | 10 | 15 | 20 | 45 | 60 |
| | Outlet SR [1/sec] | | 376 | 30 | 51 | 106 | 173 | 235 | 570 | 752 |
| | Shear rate [1/sec] | | 4119 | 266 | 453 | 987 | 1749 | 2408 | 6296 | 8239 |
| | Melt viscosity [Pa·sec] | | 54 | 122 | 104 | 82 | 69 | 63 | 47 | 43 |
| | Pressure at the tip of nozzle [kPa] | | 494 | 90 | 130 | 214 | 294 | 362 | 659 | 803 |
| | Draft ratio | | 2.6 | 3.2 | 3.1 | 3.0 | 2.8 | 2.7 | 2.5 | 2.6 |
| | Cooling air direction to the discharging direction | | 90° | 90° | 90° | 90° | 90° | 90° | 90° | 90° |
| | $T_e$ [°C] | | 250 | 250 | 250 | 250 | 250 | 250 | 250 | 250 |
| | $T_s$ [°C] | | 245 | 245 | 245 | 245 | 245 | 245 | 245 | 245 |
| | $T_p$ [°C] | | 235 | 235 | 235 | 235 | 235 | 235 | 235 | 235 |
| Fiber diameter variation | | — | None | None | None | None | None | None | None | None |
| Defect | | — | None | None | None | None | None | None | None | None |
| Coil | | — | None | Present | None | None | Present | None | None | None |

Fig.19

| | | | Ex. 10 | Ex. 11 | Ex. 12 | Ex. 13 | Ex. 14 | Ex. 15 | Ex. 16 | Ex. 17 |
|---|---|---|---|---|---|---|---|---|---|---|
| Composition ratio | Thermoplastic resin | R-1 | 34.0 | 34.0 | 34.0 | 34.0 | 34.0 | 34.0 | 34.0 | 34.0 |
| | | R-2 | — | — | — | — | — | — | — | — |
| | | R-3 | — | — | — | — | — | — | — | — |
| | | R-4 | — | — | — | — | — | — | — | — |
| | Organic liquid | L-1 | 33.8 | 33.8 | 33.8 | 33.8 | 33.8 | 33.8 | 33.8 | 33.8 |
| | | L-2 | 6.8 | 6.8 | 6.8 | 6.8 | 6.8 | 6.8 | 6.8 | 6.8 |
| | | L-3 | — | — | — | — | — | — | — | — |
| | | L-4 | — | — | — | — | — | — | — | — |
| | Inorganic fine powder | P-1 | 25.4 | 25.4 | 25.4 | 25.4 | 25.4 | 25.4 | 25.4 | 25.4 |
| | Hydrophilic additive | P-2 | — | — | — | — | — | — | — | — |
| Outlet size | Height of asperity [μm] | | 200 | 200 | 200 | 200 | 200 | 200 | 200 | 200 |
| | Width of asperity [μm] | | 400 | 400 | 400 | 400 | 400 | 400 | 400 | 400 |
| | Number of asperities [number] | | 16 | 16 | 16 | 16 | 16 | 16 | 16 | 16 |
| | Outer diameter of depressed part [mm] | | 1.72 | 1.72 | 1.72 | 1.72 | 1.72 | 1.72 | 1.72 | 1.72 |
| | Inner diameter [mm] | | 0.92 | 0.92 | 0.92 | 0.92 | 0.92 | 0.92 | 0.92 | 0.92 |
| | Cross-sectional area of outlet [mm²] | | 2.66 | 2.66 | 2.66 | 2.66 | 2.66 | 2.66 | 2.66 | 2.66 |
| | Peripheral length of outlet [mm] | | 12.9 | 12.9 | 12.9 | 12.9 | 12.9 | 12.9 | 12.9 | 12.9 |
| | Equivalent radius [mm] | | 0.41 | 0.41 | 0.41 | 0.41 | 0.41 | 0.41 | 0.41 | 0.41 |
| Condition for forming membrane | Airflow time [sec] | | 0.60 | 0.60 | 0.60 | 0.60 | 0.60 | 0.60 | 0.60 | 0.60 |
| | Discharge amount of fusion kneaded product [mm³/sec] | | 516 | 521 | 521 | 521 | 521 | 524 | 514 | 521 |
| | Linear speed $V_e$ on discharge [mm/sec] | | 194 | 196 | 196 | 196 | 196 | 197 | 193 | 196 |
| | Take-up speed $V_t$ [m/min] | | 30 | 30 | 30 | 30 | 30 | 30 | 30 | 30 |
| | Outlet SR [1/sec] | | 373 | 376 | 376 | 376 | 376 | 378 | 371 | 376 |
| | Shear rate [1/sec] | | 4044 | 4119 | 4119 | 4119 | 4119 | 4158 | 4007 | 4119 |
| | Melt viscosity [Pa·sec] | | 54 | 54 | 54 | 54 | 54 | 53 | 42 | 41 |
| | Pressure at the tip of nozzle [kPa] | | 492 | 494 | 494 | 494 | 494 | 495 | 378 | 380 |
| | Draft ratio | | 2.6 | 2.6 | 2.6 | 2.6 | 2.6 | 2.5 | 2.6 | 2.6 |
| | Cooling air direction to the discharging direction | | 0° | 15° | 30° | 45° | 60° | 90° | 90° | 90° |
| | $T_e$ [°C] | | 250 | 250 | 250 | 250 | 250 | 220 | 250 | 220 |
| | $T_s$ [°C] | | 245 | 245 | 245 | 245 | 245 | 215 | 245 | 210 |
| | $T_p$ [°C] | | 235 | 235 | 235 | 235 | 235 | 235 | 235 | 235 |
| Fiber diameter variation | | — | None | None | None | None | None | None | None | None |
| Defect | | — | None | None | None | None | None | None | Present | Present |
| Coil | | — | None | None | None | None | None | None | None | None |

Fig.20

| | | | Ex. 19 | Ex. 20 | Ex. 21 | | Ex. 22 | Ex. 23 | Ex. 24 | Ex. 25 | Ex. 26 | Ex. 27 |
|---|---|---|---|---|---|---|---|---|---|---|---|---|
| | | | | | Outer layer | Inner layer | | | | | | |
| Composition ratio | Thermoplastic resin | R-1 | — | — | 34.0 | 36.0 | 34.0 | 34.0 | 34.0 | 34.0 | 34.0 | 34.0 |
| | | R-2 | 20 | — | — | — | — | — | — | — | — | — |
| | | R-3 | — | — | — | — | — | — | — | — | — | — |
| | | R-4 | — | — | — | — | — | — | — | — | — | — |
| | Organic liquid | L-1 | 56 | — | 33.8 | 34.8 | 33.8 | 33.8 | 33.8 | 33.8 | 33.8 | 33.8 |
| | | L-2 | — | — | 6.8 | 5.0 | 6.8 | 6.8 | 6.8 | 6.8 | 6.8 | 6.8 |
| | | L-3 | — | — | — | — | — | — | — | — | — | — |
| | | L-4 | — | — | — | — | — | — | — | — | — | — |
| | Inorganic fine powder | P-1 | 24 | — | 25.4 | 24.2 | 25.4 | 25.4 | 25.4 | 25.4 | 25.4 | 25.4 |
| | Hydrophilic additive | P-2 | — | — | — | — | — | — | — | — | — | — |
| Outlet size | Height of asperity [μm] | | 200 | — | 200 | | 270 | 100 | 50 | 50 | 100 | 300 |
| | Width of asperity [μm] | | 400 | — | 400 | | 540 | 200 | 100 | 400 | 400 | 400 |
| | Number of asperities [number] | | 16 | — | 16 | | 12 | 32 | 64 | 16 | 16 | 16 |
| | Outer diameter of depressed part [mm] | | 1.72 | — | 1.72 | | 1.72 | 1.72 | 1.72 | 1.72 | 1.72 | 1.72 |
| | Inner diameter [mm] | | 0.92 | — | 0.92 | | 0.92 | 0.92 | 0.92 | 0.92 | 0.92 | 0.92 |
| | Cross-sectional area of outlet [mm²] | | 2.66 | — | 2.66 | | 3.03 | 2.16 | 1.91 | 1.91 | 2.16 | 3.17 |
| | Peripheral length of outlet [mm] | | 12.9 | — | 12.9 | | 14.4 | 12.9 | 12.9 | 9.4 | 9.8 | 15.6 |
| | Equivalent radius [mm] | | 0.41 | — | 0.41 | | 0.42 | 0.33 | 0.30 | 0.40 | 0.44 | 0.41 |
| Condition for forming membrane | Airflow time [sec] | | 0.60 | — | 0.90 | | 0.60 | 0.60 | 0.60 | 0.60 | 0.60 | 0.60 |
| | Discharge amount of fusion kneaded product [mm³/sec] | | 356 | — | 528 | | 564 | 474 | 449 | 442 | 468 | 579 |
| | Linear speed Vs on discharge [mm/sec] | | 134 | — | 204 | | 186 | 219 | 235 | 232 | 216 | 183 |
| | Take-up speed Vt [m/min] | | 20 | — | 30 | | 30 | 30 | 30 | 30 | 30 | 30 |
| | Outlet SR [1/sec] | | 262 | — | 392 | | 315 | 522 | 636 | 628 | 515 | 295 |
| | Shear rate [1/sec] | | 2888 | — | 4350 | | 3973 | 7864 | 11590 | 4356 | 3278 | 4452 |
| | Melt viscosity [Pa·sec] | | 92 | — | 53 | 28 | 54 | 44 | 39 | 53 | 57 | 52 |
| | Pressure at the tip of nozzle [kPa] | | 682 | — | 319 | | 455 | 693 | 848 | 595 | 505 | 463 |
| | Draft ratio | | 2.5 | — | 2.5 | | 2.7 | 2.3 | 2.1 | 2.2 | 2.3 | 2.7 |
| | Cooling air direction to the discharging direction | | 90° | — | 90° | | 90° | 90° | 90° | 90° | 90° | 90° |
| | $T_e$ [°C] | | 245 | — | 250 | 265 | 250 | 250 | 250 | 250 | 250 | 250 |
| | $T_s$ [°C] | | 240 | — | 260 | 260 | 245 | 245 | 245 | 245 | 245 | 245 |
| | $T_p$ [°C] | | 228 | — | 235 | 260 | 235 | 235 | 235 | 235 | 235 | 235 |
| Fiber diameter variation | | | — | — | None | | None | None | None | None | None | None |
| Defect | | | — | — | None | | None | None | None | None | None | None |
| Oil | | | — | — | None | | None | None | None | None | None | None |

Fig.21

| | | | Ex. 28 | Ex. 29 | Ex. 30 | Ex. 31 | Comp. Ex. 1 | Comp. Ex. 2 | Comp. Ex. 3 | Comp. Ex. 4 | Comp. Ex. 5 |
|---|---|---|---|---|---|---|---|---|---|---|---|
| Composition ratio | Thermoplastic resin | R-1 | 34.0 | -- | | 34.0 | 34.0 | 34.0 | 34.0 | 27 | -- |
| | | R-2 | -- | -- | | -- | -- | -- | -- | -- | -- |
| | | R-3 | -- | 34.0 | | -- | -- | -- | -- | -- | 20.0 |
| | | R-4 | -- | -- | 34.0 | -- | -- | -- | -- | -- | -- |
| | Organic liquid | L-1 | 33.8 | -- | -- | 33.8 | 46.0 | 46.0 | 33.8 | -- | -- |
| | | L-2 | 6.8 | -- | 40.6 | 6.8 | 20.0 | 20.0 | 6.8 | -- | -- |
| | | L-3 | -- | -- | -- | -- | -- | -- | -- | 57.5 | -- |
| | | L-4 | -- | 40.6 | | -- | -- | -- | -- | -- | 80 |
| | Inorganic fine powder | P-1 | 25.4 | 25.4 | 25.4 | 25.4 | -- | -- | 25.4 | -- | -- |
| | Hydrophilic additive | P-2 | -- | -- | -- | -- | -- | -- | -- | 15.5 | -- |
| Outlet size | Height of asperity [μm] | | 400 | 200 | 200 | 200 | 200 | 200 | -- | 200 | 200 |
| | Width of asperity [μm] | | 400 | 400 | 400 | 400 | 400 | 400 | -- | 400 | 400 |
| | Number of asperities [number] | | 16 | 16 | 16 | 20 | 16 | 16 | -- | 16 | 16 |
| | Outer diameter of depressed part [mm] | | 1.72 | 1.72 | 1.72 | 2.3 | 1.72 | 1.72 | 1.72 | 1.72 | 1.72 |
| | Inner diameter [mm] | | 0.92 | 0.92 | 0.92 | 1.3 | 0.92 | 0.92 | 0.92 | 0.92 | 0.92 |
| | Cross-sectional area of outlet [mm²] | | 3.67 | 2.66 | 2.66 | 4.08 | 2.66 | 2.66 | 1.66 | 2.66 | 2.66 |
| | Peripheral length of outlet [mm] | | 18.4 | 12.9 | 12.9 | 16.7 | 12.9 | 12.9 | 8.3 | 12.9 | 12.9 |
| | Equivalent radius [mm] | | 0.40 | 0.41 | 0.41 | 0.49 | 0.41 | 0.41 | 0.40 | 0.41 | 0.41 |
| Condition for forming membrane | Airflow time [sec] | | 0.60 | 0.60 | 0.60 | 0.60 | 0.01 | 0.60 | 0.60 | 0.01 | 0.01 |
| | Discharge amount of fusion kneaded product [mm³/sec] | | 633 | 521 | 521 | 931 | 455 | 417 | 417 | 445 | 866 |
| | Linear speed $V_s$ on discharge [mm/sec] | | 172 | 196 | 196 | 228 | 171 | 156 | 251 | 167 | 325 |
| | Take-up speed $V_t$ [m/min] | | 30 | 30 | 30 | 45 | 30 | 30 | 30 | 30 | 30 |
| | Outlet SR [1/sec] | | 240 | 376 | 376 | 670 | 328 | 301 | 785 | 322 | 369 |
| | Shear rate [1/sec] | | 4843 | 4119 | 4119 | 3377 | 3140 | 2636 | 4615 | 3008 | 11381 |
| | Melt viscosity [Pa·sec] | | 51 | 33 | 54 | 57 | 5 | 5 | 52 | 6 | 8 |
| | Pressure at the tip of nozzle [kPa] | | 442 | 304 | 501 | 430 | 40 | 37 | 650 | 47 | 123 |
| | Draft ratio | | 2.9 | 2.6 | 2.6 | 3.3 | 2.9 | 3.2 | 2.9 | 3.0 | 1.5 |
| | Cooling air direction to the discharging direction | | 90° | 90° | 90° | 90° | 90° | 90° | 90° | -- | 90° |
| | Te [°C] | | 250 | 170 | 230 | 250 | 240 | 240 | 250 | 70 | 170 |
| | Ts [°C] | | 245 | 170 | 230 | 245 | 230 | 230 | 245 | 70 | 170 |
| | Tp [°C] | | 235 | 170 | 180 | 235 | 210 | 210 | 235 | <50 | -- |
| Fiber diameter variation | -- | | None | None | None | None | None | None | None | None | None |
| Defect | -- | | None | None | None | None | None | None | None | None | None |
| Coil | -- | | None | None | None | None | None | None | None | None | None |

Fig. 22

| | | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| Outer diameter of projected part | (mm) | 1.39 | 1.25 | 1.26 | 1.30 | 1.36 | 1.35 | 1.40 | 1.38 | 1.39 |
| Outer diameter of depressed part | (mm) | 1.22 | 1.23 | 1.22 | 1.22 | 1.23 | 1.21 | 1.22 | 1.21 | 1.22 |
| Inner diameter | (mm) | 0.67 | 0.67 | 0.68 | 0.66 | 0.67 | 0.68 | 0.68 | 0.66 | 0.67 |
| Height of asperity | ($\mu$m) | 86 | 12 | 21 | 42 | 67 | 71 | 88 | 86 | 87 |
| Width of asperity | ($\mu$m) | 129 | 18 | 32 | 63 | 101 | 107 | 132 | 129 | 131 |
| Number of asperities | (number) | 16 | 16 | 16 | 16 | 16 | 16 | 16 | 16 | 16 |
| Asperity proportion on the periphery | (%) | 100 | 100 | 100 | 100 | 100 | 100 | 100 | 100 | 100 |
| Proportion of depressed part | (%) | 50 | 50 | 50 | 50 | 50 | 50 | 50 | 50 | 50 |
| Distance of closest approach | (mm) | 1.38 | 1.24 | 1.25 | 1.30 | 1.35 | 1.35 | 1.38 | 1.39 | 1.38 |
| Distance of closest approach/ (r1+r2) | (—) | 1.05 | 1.00 | 1.01 | 1.03 | 1.04 | 1.05 | 1.06 | 1.07 | 1.06 |
| Ellipticity | (—) | 1.03 | 1.05 | 1.01 | 1.03 | 1.02 | 1.08 | 1.06 | 1.09 | 1.15 |
| Deionized water permeability | (L/m2/hr) | 5000 | 5000 | 5000 | 5000 | 5000 | 5000 | 5000 | 5000 | 5000 |
| Pore ratio of projected part on outer surface | (%) | 30.1 | 30.2 | 29.8 | 30.3 | 30.2 | 30.0 | 30.2 | 30.1 | 30.2 |
| Pore ratio of depressed part on outer surface | (%) | 35.9 | 33.2 | 33.5 | 34.5 | 35.0 | 35.5 | 36.0 | 36.1 | 35.9 |
| Ratio of depressed part/ projected part pore ratio on the outer surface | (—) | 1.19 | 1.10 | 1.12 | 1.14 | 1.16 | 1.18 | 1.19 | 1.20 | 1.19 |
| Strength at break | (MPa) | 7.2 | 7.2 | 7.4 | 7.2 | 7.3 | 7.2 | 7.4 | 7.3 | 7.3 |
| Elongation at break | (%) | 180 | 180 | 180 | 180 | 180 | 180 | 150 | 120 | 95 |
| Latex rejection | (%) | >99 | >99 | >99 | >99 | >99 | >99 | >99 | >99 | >99 |
| Compressive strength | (MPa) | 0.85 | 0.80 | 0.85 | 0.90 | 0.85 | 0.85 | 0.85 | 0.85 | 0.85 |
| Maximum pore size | ($\mu$m) | 0.42 | 0.41 | 0.44 | 0.41 | 0.41 | 0.42 | 0.41 | 0.40 | 0.40 |
| Average pore size | ($\mu$m) | 0.28 | 0.27 | 0.28 | 0.28 | 0.26 | 0.26 | 0.26 | 0.27 | 0.27 |
| Maximum pore size/ average pore size | (—) | 1.50 | 1.52 | 1.57 | 1.46 | 1.58 | 1.50 | 1.46 | 1.48 | 1.48 |
| Water permeation amount of actual liquid in (22) | (m/day) | 2.9 | 2.1 | 2.3 | 2.7 | 2.9 | 2.9 | 2.9 | 2.9 | 2.9 |

Fig.23

| | | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|---|
| Outer diameter of projected part | (mm) | 1.40 | 1.39 | 1.39 | 1.39 | 1.39 | 1.39 | 1.39 | 1.39 | 1.40 |
| Outer diameter of depressed part | (mm) | 1.23 | 1.22 | 1.22 | 1.22 | 1.22 | 1.22 | 1.22 | 1.22 | 1.24 |
| Inner diameter | (mm) | 0.66 | 0.67 | 0.67 | 0.67 | 0.67 | 0.67 | 0.68 | 0.69 | 0.66 |
| Height of asperity | (μm) | 84 | 86 | 86 | 86 | 86 | 87 | 83 | 86 | 91 |
| Width of asperity | (μm) | 126 | 129 | 129 | 129 | 129 | 131 | 125 | 129 | 137 |
| Number of asperities | (number) | 16 | 16 | 16 | 16 | 16 | 16 | 16 | 16 | 16 |
| Asperity proportion on the periphery | (%) | 100 | 100 | 100 | 100 | 100 | 100 | 100 | 100 | 100 |
| Proportion of depressed part | (%) | 50 | 50 | 50 | 50 | 50 | 50 | 50 | 50 | 50 |
| Distance of closest approach | (mm) | 1.38 | 1.39 | 1.39 | 1.40 | 1.39 | 1.40 | 1.38 | 1.38 | 1.40 |
| Distance of closest approach/(r1+r2) | (–) | 1.05 | 1.06 | 1.05 | 1.07 | 1.06 | 1.07 | 1.06 | 1.06 | 1.06 |
| Ellipticity | (–) | 1.06 | 1.03 | 1.03 | 1.03 | 1.03 | 1.07 | 1.16 | 1.18 | 1.02 |
| Deionized water permeability | (L/m²/hr) | 4900 | 5000 | 5000 | 5000 | 5000 | 5000 | 8900 | 9200 | 2500 |
| Pore ratio of projected part on outer surface | (%) | 30.2 | 30.0 | 29.9 | 30.1 | 30.3 | 30.4 | 30.5 | 30.3 | 25.0 |
| Pore ratio of depressed part on outer surface | (%) | 33.1 | 34.5 | 35.7 | 35.8 | 36.1 | 32.7 | 32.5 | 31.9 | 29.5 |
| Ratio of depressed part/projected part pore ratio on the outer surface | (–) | 1.10 | 1.15 | 1.19 | 1.19 | 1.19 | 1.08 | 1.07 | 1.05 | 1.18 |
| Strength at break | (MPa) | 7.4 | 7.4 | 7.4 | 7.4 | 7.4 | 7.4 | 8.2 | 8.1 | 9.5 |
| Elongation at break | (%) | 180 | 180 | 180 | 180 | 180 | 130 | 110 | 100 | 200 |
| Latex rejection | (%) | >99 | >99 | >99 | >99 | >99 | >99 | 77 | 79 | >99 |
| Compressive strength | (MPa) | 0.90 | 0.90 | 0.90 | 0.90 | 0.90 | 0.90 | 0.75 | 0.75 | 0.80 |
| Maximum pore size | (μm) | 0.57 | 0.50 | 0.47 | 0.44 | 0.43 | 0.44 | 0.63 | 0.65 | 0.30 |
| Average pore size | (μm) | 0.28 | 0.28 | 0.28 | 0.28 | 0.28 | 0.27 | 0.35 | 0.36 | 0.18 |
| Maximum pore size/average pore size | (–) | 2.04 | 1.79 | 1.68 | 1.57 | 1.54 | 1.63 | 1.80 | 1.81 | 1.67 |
| Water permeation amount of actual liquid in (22) | (m/day) | 2.4 | 2.6 | 2.9 | 2.9 | 2.9 | 2.8 | 2.6 | 2.4 | 2.4 |
| Water permeation amount of actual liquid in (23) | (m/day) | – | – | – | – | – | 0.70 | 0.68 | 0.62 | 0.59 |
| Fretting resistance | (%) | 85 | 90 | 95 | 95 | 95 | 95 | 95 | 95 | 95 |

Fig. 24

| | | Ex. 19 | Ex. 20 | Ex. 21 Outer layer | Ex. 21 Inner layer | Ex. 22 | Ex. 23 | Ex. 24 | Ex. 25 | Ex. 26 | Ex. 27 |
|---|---|---|---|---|---|---|---|---|---|---|---|
| Outer diameter of projected part | (mm) | 1.34 | 1.33 | 1.40 | | 1.48 | 1.32 | 1.27 | 1.27 | 1.31 | 1.52 |
| Outer diameter of depressed part | (mm) | 1.18 | 1.15 | 1.22 | | 1.22 | 1.22 | 1.22 | 1.22 | 1.22 | 1.22 |
| Inner diameter | (mm) | 0.68 | 0.66 | 0.67 | | 0.67 | 0.67 | 0.67 | 0.67 | 0.67 | 0.67 |
| Height of asperity | (μm) | 95 | 92 | 89 | | 118 | 45 | 24 | 21 | 42 | 134 |
| Width of asperity | (μm) | 143 | 138 | 126 | | 177 | 60 | 36 | 128 | 125 | 128 |
| Number of asperities | (number) | 16 | 16 | 16 | | 12 | 32 | 64 | 16 | 16 | 16 |
| Asperity proportion on the periphery | (%) | 100 | 100 | 100 | | 100 | 100 | 100 | 100 | 100 | 100 |
| Proportion of depressed part | (%) | 50 | 50 | 50 | | 50 | 50 | 50 | 50 | 50 | 50 |
| Distance of closest approach | (mm) | 1.32 | 1.32 | 1.39 | | 1.45 | 1.31 | 1.26 | 1.26 | 1.30 | 1.47 |
| Distance of closest approach/ (r1+r2) | (—) | 1.05 | 1.08 | 1.06 | | 1.07 | 1.03 | 1.01 | 1.02 | 1.03 | 1.07 |
| Ellipticity | (—) | 1.01 | 1.01 | 1.02 | | 1.01 | 1.01 | 1.01 | 1.01 | 1.01 | 1.01 |
| Deionized water permeability | (L/m²/hr) | 5800 | 7800 | 8000 | | 5000 | 5000 | 5000 | 5000 | 5000 | 5000 |
| Pore ratio of projected part on outer surface | (%) | 30.4 | 40.4 | 30.6 | | 30.2 | 30.2 | 30.2 | 30.2 | 30.2 | 30.2 |
| Pore ratio of depressed part on outer surface | (%) | 36.1 | 46.5 | 36.3 | | 35.5 | 36.2 | 33.2 | 32.9 | 34.1 | 36.2 |
| Ratio of depressed part/projected part pore ratio on the outer surface | (—) | 1.19 | 1.15 | 1.19 | | 1.18 | 1.20 | 1.10 | 1.09 | 1.13 | 1.20 |
| Strength at break | (MPa) | 4.5 | 7.6 | 7.6 | | 7.2 | 7.2 | 7.2 | 7.2 | 7.2 | 7.2 |
| Elongation at break | (%) | 500 | 100 | 180 | | 180 | 180 | 180 | 180 | 180 | 180 |
| Latex rejection | (%) | >99 | >99 | >99 | | >99 | >99 | >99 | >99 | >99 | >99 |
| Compressive strength | (MPa) | 0.60 | 0.65 | 0.90 | | 0.90 | 0.90 | 0.90 | 0.90 | 0.90 | 0.90 |
| Maximum pore size | (μm) | 0.44 | 0.56 | 0.44 | | 0.42 | 0.42 | 0.42 | 0.42 | 0.42 | 0.42 |
| Average pore size | (μm) | 0.30 | 0.35 | 0.27 | | 0.28 | 0.29 | 0.28 | 0.28 | 0.28 | 0.28 |
| Maximum pore size/ average pore size | (—) | 1.47 | 1.60 | 1.60 | | 1.50 | 1.50 | 1.50 | 1.50 | 1.50 | 1.50 |
| Water permeation amount of actual liquid in (22) | (m/day) | 2.7 | 3.8 | 3.5 | | 2.6 | 2.9 | 2.9 | 2.7 | 2.9 | 2.7 |
| Water permeation amount of actual liquid in (23) | (m/day) | 0.74 | 0.96 | 0.80 | | 0.65 | 0.73 | 0.73 | 0.66 | 0.73 | 0.68 |
| Fretting resistance | (%) | 90 | 95 | 95 | | 95 | 95 | 95 | 75 | 90 | 95 |

Fig. 25

| | | Ex. 28 | Ex. 29 | Ex. 30 | Ex. 31 | Comp. Ex. 1 | Comp. Ex. 2 | Comp. Ex. 3 | Comp. Ex. 4 | Comp. Ex. 5 |
|---|---|---|---|---|---|---|---|---|---|---|
| Outer diameter of projected part | (mm) | 1.62 | 1.41 | 1.41 | 1.60 | 1.31 | — | — | 1.30 | 1.64 |
| Outer diameter of depressed part | (mm) | 1.22 | 1.22 | 1.22 | 1.40 | 1.23 | 1.18 | 1.22 | 1.25 | 1.58 |
| Inner diameter | (mm) | 0.67 | 0.67 | 0.67 | 0.90 | 0.67 | 0.69 | 0.68 | 0.70 | 0.70 |
| Height of asperity | (μm) | 178 | 86 | 86 | 91 | 28–32 | — | — | 0–45 | 0–30 |
| Width of asperity | (μm) | 126 | 129 | 129 | 137 | 50–78 | — | — | 0–98 | 0–100 |
| Number of asperities | (number) | 16 | 16 | 16 | 20 | 12 | — | — | 10 | 14 |
| Asperity proportion on the periphery | (%) | 100 | 100 | 100 | 100 | 40 | — | — | 55 | 80 |
| Proportion of depressed part | (%) | 50 | 50 | 50 | 50 | 10 | — | — | 10 | 10 |
| Distance of closest approach | (mm) | 1.57 | 1.37 | 1.36 | 1.57 | 1.25 | 1.16 | 1.22 | 1.20 | 1.48 |
| Distance of closest approach / (r1 + r2) | (—) | 1.11 | 1.04 | 1.03 | 1.05 | 0.98 | 1.00 | 1.00 | 0.93 | 0.92 |
| Ellipticity | (—) | 1.01 | 1.03 | 1.03 | 1.06 | 1.27 | 1.31 | 1.06 | 1.18 | 1.18 |
| Deionized water permeability | (L/m²/hr) | 5000 | 3000 | 3500 | 5800 | 6200 | 1060 | 4500 | 3000 | 3000 |
| Pore ratio of projected part on outer surface | (%) | 30.2 | 19.2 | 24.2 | 30.2 | 15.3 | 7.4 | 30.1 | 30.3 | 30.3 |
| Pore ratio of depressed part on outer surface | (%) | 36.2 | 35.8 | 35.9 | 36.1 | 15.2 | 7.4 | 30.2 | 30.1 | 30.1 |
| Ratio of depressed part / projected part pore ratio on the outer surface | (—) | 1.20 | 1.86 | 1.48 | 1.20 | 0.99 | 1.00 | 1.00 | 0.99 | 0.99 |
| Strength at break | (MPa) | 7.2 | 3.3 | 5.4 | 6.3 | 5.2 | 5.5 | 5.2 | 8.0 | 7.2 |
| Elongation at break | (%) | 180 | 110 | 450 | 190 | 80 | 90 | 180 | 100 | 170 |
| Latex rejection | (%) | >99 | >99 | >99 | >99 | >99 | >99 | >99 | >99 | >99 |
| Compressive strength | (MPa) | 0.90 | 0.40 | 0.55 | 0.52 | 0.60 | 0.80 | 0.85 | 0.75 | 0.75 |
| Maximum pore size | (μm) | 0.42 | 0.35 | 0.35 | 0.38 | 0.65 | 0.66 | 0.41 | <0.1 | <0.1 |
| Average pore size | (μm) | 0.28 | 0.20 | 0.22 | 0.25 | 0.24 | 0.32 | 0.27 | <0.1 | <0.1 |
| Maximum pore size / average pore size | (—) | 1.50 | 1.75 | 1.59 | 1.52 | 2.71 | 2.13 | 1.52 | — | — |
| Water permeation amount of actual liquid in (22) | (m/day) | 2.9 | 2.2 | 2.4 | 3.1 | 1.6 | — | 1.8 | 2.0 | 1.6 |
| Water permeation amount of actual liquid in (33) | (m/day) | 0.73 | 0.55 | 0.60 | 0.75 | 0.50 | — | 0.40 | — | — |
| Fretting resistance | (%) | 95 | 70 | 70 | 95 | 40 | 40 | 40 | 30 | 40 |
| Retention of height of projected part | (%) | >99 | 80 | 80 | >99 | 95 | — | — | 90 | 80 |
| Drying resistance | (%) | >95 | >95 | >95 | >95 | 45 | — | — | 45 | — |

PRODUCTION METHOD OF DEFORMED POROUS HOLLOW FIBER MEMBRANE

The present application is a divisional of U.S. application Ser. No. 13/382,039, which is a National stage of International Patent Application No. PCT/JP2010/063772 filed Aug. 13, 2010, which claims priority to Japanese Application No. 2010-095200 filed Apr. 16, 2010. The disclosures of U.S. application Ser. No. 13/382,039 and International Patent Application No. PCT/JP2010/063772 are incorporated by reference herein in their entireties.

TECHNICAL FIELD

The present invention relates to a deformed porous hollow fiber membrane, a production method of the deformed porous hollow fiber membrane, and a module, a filtration device, and a water treatment method in which the deformed porous hollow fiber membrane is used. The present invention specifically relates to a deformed porous hollow fiber membrane having asperities on the periphery and a production method thereof, a module and a filtration device in which the deformed porous hollow fiber membrane is used, and a method of treating water containing an inorganic substance and/or an organic substance using the deformed porous hollow fiber membrane.

BACKGROUND ART

In recent years, porous membranes such as ultrafiltration membranes and micro-filtration membranes are used in various fields such as recovery of electrodeposition paint, removal of microparticles from ultrapure water, production of pyrogen-free water, concentration of enzymes, sterile filtration and clarification of fermentation liquid, and treatment of clean water, sewage, and drainage. In particular, porous hollow fiber membranes have high packing density per unit volume of the membrane and make it possible to miniaturize a treatment device, thereby being widely used.

In the case of filtrating various fluid to be treated using porous hollow fiber membranes, there is a serious problem that adsorption, blockage, or deposition of a part of inorganic substances and/or organic substances that are contained in the fluid to be treated occurring inside the small membrane pores or on the membrane surface, so-called fouling, decreases the water permeability performance.

As a method of controlling such a fouling phenomenon, a physical washing method (so-called air scrubbing) to introduce air into a receptacle of hollow fiber membranes to vibrate liquid inside the receptacle so as to remove microparticles adhering to the surfaces of the hollow fiber membranes is disclosed in Patent Document 1. Not only for the casing type modules as described in Patent Document 1 but also for, for example, non-casing type (immersion type) modules to be often used in MBR (a membrane bioreactor) and the like, a method of controlling fouling by introducing air from the bottom of the module is generally used. However, this method has a problem that, although it is possible to effectively inhibit fouling of the membranes, a phenomenon of the membranes coming into contact with each other to block small pores on the membrane outer surface, so-called "fretting", tends to develop and, as a result, the water permeability performance of the membranes decreases in a long-term operation.

To enhance the effect of this air scrubbing, a membrane with a creative shape is also disclosed. In Patent Document 2, a membrane is disclosed in which hollow fibers are provided with serpentine-shaped crimps so as to inhibit a decrease in treatment performance resulting from hollow fibers coming into contact with each other to lower the membrane surface area and from retention of fluid.

In Patent Document 3, a membrane is disclosed in which minute protrusions are provided at a part of the peripheries of the hollow fiber membranes so as to enhance the effect of air scrubbing. In Patent Document 4, a membrane of the same shape as that in Patent Document 3 to be used in dialysis is disclosed.

DISCLOSURE OF THE INVENTION

Patent Document 1: Japanese Patent Application Laid-Open Publication No. Sho-60-19002

Patent Document 2: Japanese Patent Application Laid-Open Publication No. Sho-57-194007

Patent Document 3: International Publication No. WO 2008/62788

Patent Document 4: Japanese Patent Application Laid-Open Publication No. Sho-58-169510

SUMMARY OF INVENTION

Technical Problem

However, it cannot be said that an enough effect can be obtained with the membranes disclosed in Patent Documents 2 to 4 in terms of improvement in the effect of air scrubbing and inhibition of fretting.

With the shape disclosed in Patent Document 2, it is impossible to control flow of liquid throughout the membrane surface because a crimp interval in the longitudinal direction of hollow fibers is as long as a few millimeters to dozens of millimeters and, as a result, nonuniform fouling occurs, whereby it is impossible to obtain an enough effect. Furthermore, the angle of the membranes coming into contact with each other may change, or the membranes may be bent to come into contact with each other due to air scrubbing, and thus, the effect of inhibiting fretting is small, and it is impossible to inhibit a decrease in water permeability performance adequately.

The membrane disclosed in Patent Document 3 has protrusions only at a part of the circumferences constituting the peripheries of the hollow fiber membranes, and thus, the effect of improving its performance on actual liquid is small and fretting cannot be inhibited adequately.

In addition to these problems, in the case of non-casing type (immersion type) modules, drying of membranes is also a problem. As for hydrophobic membranes, when they are dry, water does not pass through the small pores unless high pressure is applied, and therefore hydrophilization treatment with liquid of low surface tension (ethanol, for example) is required. Membrane products are often stored and shipped in a state in which they are impregnated with moisturizing fluid such as glycerol or a surfactant so as to be ready to filtrate at low filtration pressure without requiring hydrophilization treatment carried out before use. However, if it takes a long time to take the membrane module out of a bag and install it to a filtration facility before starting filtration (in particular in the case of a large facility), the membranes may dry. It is impossible to use dried parts of the membranes for filtration, and therefore there have been occasions in which efficient use of the entire membranes in practical use was not achieved. As for the problem of this membrane drying, the membrane described in Patent Document 2 has no effect of preventing drying because each crimp is shaped too large to produce the effect of holding moisturizing fluid, and the membrane described in Patent Document 3 has little effect because only a part of the circumferences has protrusions.

Thus, a porous hollow fiber membrane having high water permeability performance on actual liquid, high fretting resistance, and further drying resistance has not yet been obtained.

A problem to be solved by the present invention is to provide a deformed porous hollow fiber membrane that is suitable for treatment of liquid containing an inorganic substance and/or an organic substance, is obtained at low cost, has high water permeability performance, and further has improved fretting resistance and drying resistance, a production method of the deformed porous hollow fiber membrane, and a module, a filtration device, and a water treatment method in which the deformed porous hollow fiber membrane is used.

Solution to Problem

The present inventors have made intensive research to solve these problems and, as a result, found that it is crucial for a porous hollow fiber membrane composed of a thermoplastic resin to have continuous asperities on the periphery in the longitudinal direction of the membrane and to have a shape including a continuous projected and depressed parts on the periphery of the hollow fiber membrane in order to improve the water permeability performance on actual liquid, the fretting resistance, and the drying resistance. Thus, they have now completed the present invention.

Accordingly, the present invention is as follows.

(1) A deformed porous hollow fiber membrane composed of a thermoplastic resin including a continuous asperity provided on the periphery in the longitudinal direction of the membrane, in which the periphery of the hollow fiber membrane includes continuous projected and depressed parts, (2) the deformed porous hollow fiber membrane according to (1), in which the sum of the distance from the center of the porous hollow fiber membrane to the top of the projected part and the distance from the center of the porous hollow fiber membrane to the bottom of the depressed part is shorter than the center-to-center distance of the porous hollow fiber membranes adjacent to each other, (3) the deformed porous hollow fiber membrane according to (1), in which the asperity is formed from a plurality of depressed parts and a plurality of projected parts that are provided on the periphery, and the pore ratio of the depressed part is higher than the pore ratio of the projected part, (4) the deformed porous hollow fiber membrane according to (1), in which the difference between the height of the bottom part and that of the top part of the asperity is 1 μm to 320 μm.

(5) the deformed porous hollow fiber membrane according to (1), in which, as for the outer surface of the deformed porous hollow fiber membrane, the value resulting from dividing the pore ratio of the outer surface of the depressed part by the pore ratio of the outer surface of the projected part is 1.01 to not larger than 2.00, (6) the deformed porous hollow fiber membrane according to (1), in which the asperity is formed from the plurality of depressed parts and the plurality of projected parts that are provided on the periphery, and the ratio of the surface pore size in the depressed part to that in the projected part is 0.5 to 1.5, (7) the deformed porous hollow fiber membrane according to (1), in which the asperity is formed from at least the depressed parts provided on the periphery, and the proportion of the depressed part to the entire periphery in a cross section of the membrane along the direction perpendicular to the longitudinal direction of the membrane is not lower than 5% and not higher than 100%, (8) the deformed porous hollow fiber membrane according to (1), in which the proportion of the projected and depressed parts to the length of the periphery in the cross section of the deformed porous hollow fiber membrane is not lower than 30%, (9) the deformed porous hollow fiber membrane according to (1), in which the deformed porous hollow fiber membrane is a porous membrane having an isotropic three-dimensional network structure,

(10) the deformed porous hollow fiber membrane according to (1), in which the aspect ratio of an outer surface pore of the deformed porous hollow fiber membrane is 0.3 to 3.0,

(11) the deformed porous hollow fiber membrane according to (1), in which the width of the asperity is 1 μm to 500 μm,

(12) the deformed porous hollow fiber membrane according to (1), in which the asperity number on the periphery that is the number of the asperities is not smaller than 1 and not larger than 300,

(13) the deformed porous hollow fiber membrane according to (1), in which the thermoplastic resin includes polyvinylidene fluoride and a polyolefin.

(14) A production method of a deformed porous hollow fiber membrane by thermally induced phase separation including discharging a fusion kneaded product containing a thermoplastic resin and an organic liquid through the orifice of a hollow fiber-forming deformed nozzle, cooling and solidifying the fusion kneaded product discharged through the deformed nozzle to form it into a hollow fiber-like material having a deformed cross section at a cross section vertical to the discharging direction, and then extracting away the organic liquid from the hollow fiber-like material to obtain the deformed porous hollow fiber membrane, in which an inorganic fine powder is kneaded in the fusion kneaded product,

(15) the production method of a deformed porous hollow fiber membrane according to (14), in which the shape of the deformed nozzle at the side for forming the periphery of the hollow fiber-like material is formed with a plurality of depressed parts and projected parts being alternately and circumferentially arranged,

(16) the production method of a deformed porous hollow fiber membrane according to (14), in which a continuous protrusion part is provided on the periphery of the hollow fiber-like material and the porous hollow fiber membrane in the longitudinal direction of the membrane,

(17) the production method of a deformed porous hollow fiber membrane according to (14), in which the pressure at an outlet on discharge of the fusion kneaded product is not lower than 100 kPa and not higher than 900 kPa,

(18) the production method of a deformed porous hollow fiber membrane according to (14), in which the fusion kneaded product passes through the air gap after being discharged through the deformed nozzle and before being cooled and solidified and, in the air gap, the fusion kneaded product is blown at a certain angle from the direction that is not parallel to the pass through direction of the fusion kneaded product,

(19) the production method of a deformed porous hollow fiber membrane according to (14), in which the thermoplastic resin is composed of polyvinylidene fluoride, a polyolefin, and a blend of polyvinylidene fluoride and a polyolefin,

(20) the production method of a deformed porous hollow fiber membrane according to (14), in which plasticizer is hydrophobic,

(21) the production method of a deformed porous hollow fiber membrane according to (14), in which both of the resin temperature at the time of supplying the fusion kneaded product from an extruder toward the deformed nozzle and the resin temperature at the time of discharging it through the orifice are higher than the torque inflection temperature of the fusion kneaded product measured with a plastomill,

(22) a hollow fiber membrane module including the deformed porous hollow fiber membrane according to (1),

(23) a membrane filtration device including the hollow fiber membrane module according to (22).

(24) A water treatment method including filtrating a fluid to be treated containing at least one of an inorganic substance and an organic substance using the membrane filtration device according to (23).

Advantageous Effects of Invention

According to the present invention, it is possible to obtain a production method of a deformed porous hollow fiber membrane that is suitable for treatment of liquid containing an inorganic substance and/or an organic substance, is obtained at low cost, and has a high surface pore rate, namely high water permeability performance, the deformed porous hollow fiber membrane, and a module, a filtration device, and a water treatment method in which the deformed porous hollow fiber membrane is used.

BRIEF DESCRIPTION OF THE DRAWINGS

FIG. 9 is a view showing an arrangement of a hollow fiber membrane module.

FIG. 18 is a table showing preparation conditions for hollow fiber membranes according to Examples.

FIG. 19 is a table showing preparation conditions for hollow fiber membranes according to Examples.

FIG. 20 is a table showing preparation conditions for hollow fiber membranes according to Examples.

FIG. 21 is a table showing preparation conditions for hollow fiber membranes according to Examples and Comparative Examples.

FIG. 22 is a table showing evaluation results of various physical properties and performance on actual liquid of porous hollow fiber membranes according to Examples.

FIG. 23 is a table showing evaluation results of various physical properties and performance on actual liquid of porous hollow fiber membranes according to Examples.

FIG. 24 is a table showing evaluation results of various physical properties and performance on actual liquid of porous hollow fiber membranes according to Examples.

FIG. 25 is a table showing evaluation results of various physical properties and performance on actual liquid of porous hollow fiber membranes according to Examples and Comparative Examples.

BEST MODES FOR CARRYING OUT THE INVENTION

Embodiments for carrying out the present invention (hereinafter, referred to as embodiments of the present invention) will be described in detail. The present invention is not limited to the following embodiments and can be used with various modifications within the scope of the present invention.

<Deformed Porous Hollow Fiber Membrane>

Figure 1:
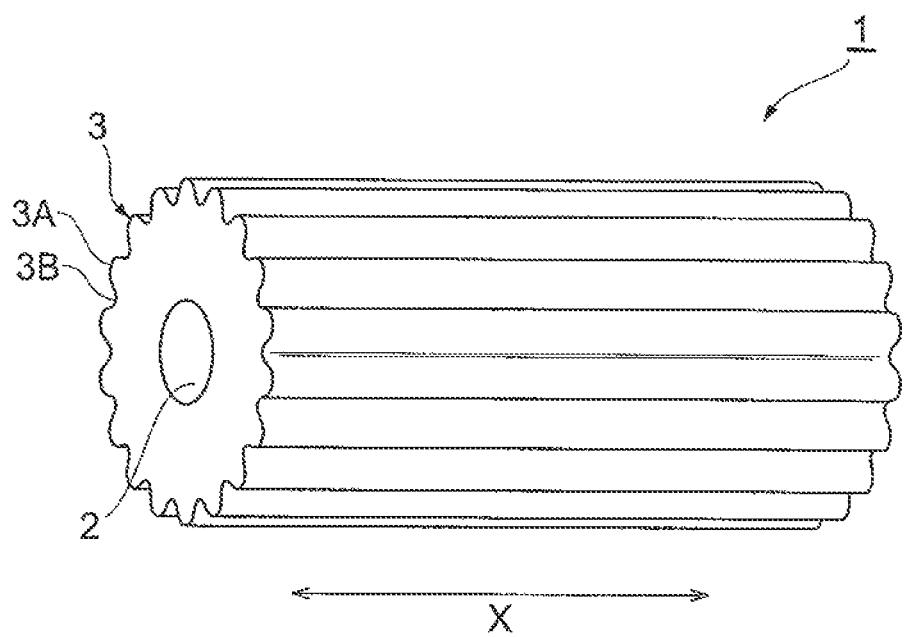
FIG. 1 is a schematic view showing an example of an embodiment of a deformed porous hollow fiber membrane according to an embodiment of the present invention.
Figure 2:
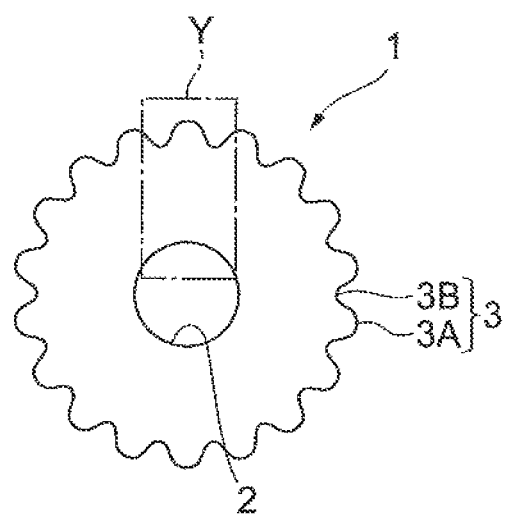
FIG. 2 is a cross sectional view showing a cross section vertical to the longitudinal direction of the deformed porous hollow fiber membrane in FIG. 1.

First, a deformed porous hollow fiber membrane according to an embodiment of the present invention is described referring to FIGS. 1 and 2. FIG. 1 is a schematic view showing an arrangement of a deformed porous hollow fiber membrane according to the embodiment of the present invention. FIG. 2 is a cross sectional view showing a cross section vertical to the longitudinal direction of the deformed porous hollow fiber membrane in FIG. 1.

A deformed porous hollow fiber membrane 1 according to the embodiment of the present invention is composed of a thermoplastic resin and, as shown in FIG. 1, is a porous hollow fiber membrane that has a substantially cylindrical shape having an aperture 2 at its center part and the periphery of which includes asperities 3 that are continuous in the longitudinal direction. "Periphery" means the outer surface part of the porous hollow fiber membrane. "The longitudinal direction" means the direction perpendicular to the outer circumference of the deformed porous hollow fiber membrane 1 (namely, the extending direction of the aperture 2, which is the direction shown by the arrow X in FIG. 1). "Includes asperities that are continuous in the longitudinal direction" means that cross sections at any positions along the outer circumference direction, which is perpendicular to the longitudinal direction, of the deformed porous hollow fiber membrane 1 (hereinafter, referred to as a cross section of the deformed porous hollow fiber membrane 1) have substantially the same asperity structures. Each asperity extends along the longitudinal direction of the deformed porous hollow fiber membrane 1. Therefore, the cross sections of the deformed porous hollow fiber membrane 1 are formed to have substantially identical asperity structures regardless of the cutting positions.

With such a membrane shape, it is possible to obtain the effects that (1) high water permeability performance on actual liquid can be exhibited because the flow at the membrane surface at the time of filtration is irregular, (2) a decrease in water permeability performance due to fretting can be inhibited because the positions at which membranes are likely to come into contact with each other are limited to projected parts, and (3) drying resistance improves because depressed parts easily hold a moisturizer.

As for the depressed part and the projected part included in the asperity, in a cross section of the deformed porous hollow fiber membrane 1, a part that projects beyond the outside of the periphery of the membrane (a region the center of curvature of which is inside the periphery of the deformed porous hollow fiber membrane 1) is referred to as a projected part 3A, and a part that is depressed at the outside of the periphery of the membrane (a region the center of curvature of which is outside the periphery of the deformed porous hollow fiber membrane 1) is referred to as a depressed part 3B. Note that an asperity is formed on the periphery even if either of the depressed part and the projected part is not provided. For example, when the projected parts are not provided, the tops of the depressed parts are adjacent to each other to form pointed parts having a hump-shaped cross section between the depressed parts, however, these pointed parts are not the projected parts because these are not the regions the centers of curvature of which are inside the periphery of the deformed porous hollow fiber membrane 1. On the other hand, when the depressed parts are not provided, the bottoms of the projected parts are adjacent to each other to form V-shaped slots between the projected parts, however, these slots are not the depressed parts because these are not the regions the centers of curvature of which are outside the periphery of the deformed porous hollow fiber membrane 1.

In the case of a membrane with a small number of asperities, the membrane to be obtained has a circumference (line) that is concentrical with the inner diameter, as in the case of an ordinary circular membrane, at a part of the periphery. In this case, the peripheral part concentrical with the inner diameter is referred to as a circumferential part, which is clearly differentiated from the projected part provided by a protrusion as described above. When the periphery includes the depressed part and the projected part with no circumferential part included, it is possible to achieve high performance on actual liquid and fretting resistance.

(Shape of Asperity)

Figure 3:
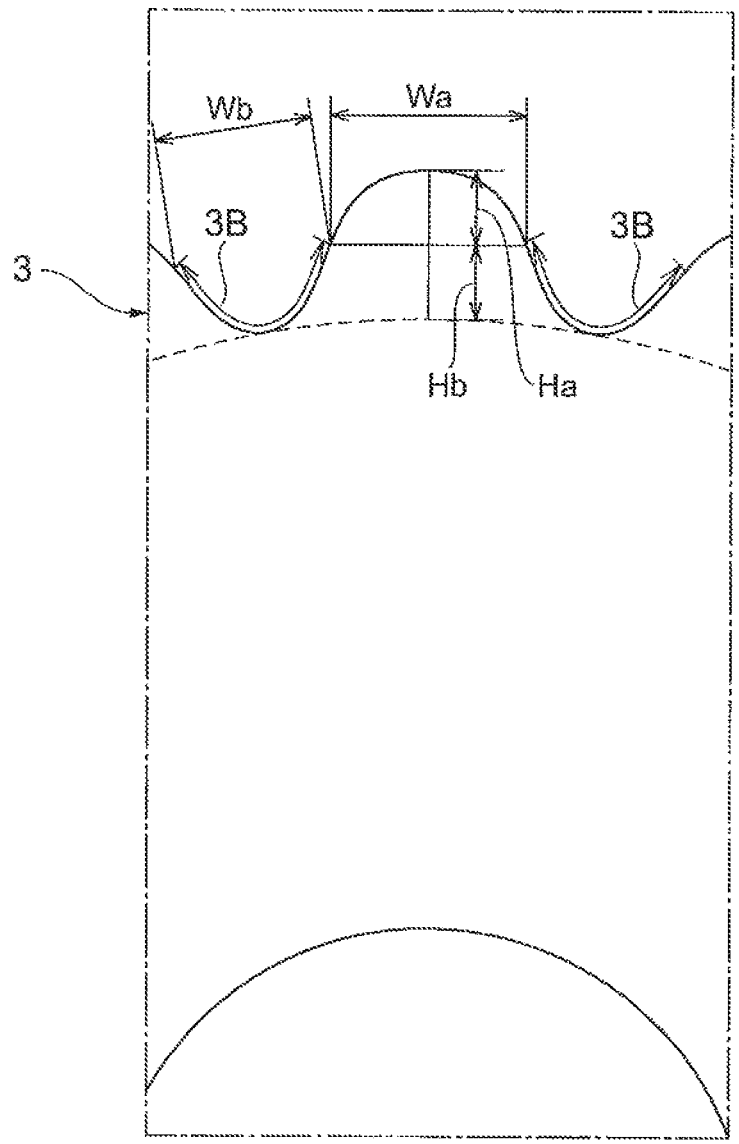
FIG. 3 is an enlarged view of a part of the cross sectional view in FIG. 2, which is a view showing the height and the width of an asperity.

Next, the asperity to be formed on the periphery of the deformed porous hollow fiber membrane 1 will be described. FIG. 3 is an enlarged view of a part of the cross sectional view in FIG. 2 (the region Y surrounded by alternate long and short dash lines), which is a view showing the height and the width of an asperity.

Although it is impossible to flatly define the height and the width of an asperity and the number of projected and depressed parts on the periphery of the membrane by the total length of the periphery or the height and the width of an asperity of the hollow fiber membrane, these are preferably within the range to be described below in order to fully exhibit the effects of the present invention.

The height of projected and depressed parts is preferably not smaller than 1 μm and not larger than 320 μm. The height of projected and depressed parts described herein refers to the length from the point at which the membrane thickness of the deformed porous hollow fiber membrane 1 (the distance from the inner face of the aperture 2 to the periphery) is smallest (generally the bottom of a depressed part) or, when a circumferential part with no asperity is formed, from the surface of the circumferential part, to the top of a projected part. As shown in FIG. 3, it is possible to represent the height of projected and depressed parts described herein as the sum of the height Ha of a region that forms a projected part (the projected part 3A in FIGS. 1 and 2) and the height (depth) Hb of a region that forms the depressed part 3B. When the height of the asperity is not smaller than 1 μm, it is possible to exhibit high recovery after washing and fretting resistance, and when the height is not larger than 320 μm, it is possible to pack membranes at a practical packing rate on modularization. More preferable is not smaller than 5 μm and not larger than 200 μm, and further preferable is not smaller than 10 μm and not larger than 160 μm.

The width of projected and depressed parts is preferably not smaller than 1 μm and not larger than 500 μm. The width of projected and depressed parts described herein refers to the width of a region that forms a projected part and a depressed part and, as shown in FIG. 3, is represented as the sum of the width Wa of a projected part and the width Wb of the depressed part of the deformed porous hollow fiber membrane 1. On actual measurement, the linear distance between the bottoms of depressed parts that are adjacent to each other may be measured. When the width of an asperity is not smaller than 1 μm, protrusions do not collapse on external pressure filtration, and therefore it is possible to adequately inhibit fretting of a depressed part. When it is not larger than 500 μm, it is possible to effectively inhibit adhesion and deposition of an inorganic substance and/or an organic substance onto the tip of protrusions by a complicated flow of fluid in the vicinity of the membrane surface. The width of an asperity is more preferably not smaller than 5 μm and not larger than 400 μm, and further preferably not smaller than 10 μm and not larger than 300 μm.

Preferably, the width Wb of a depressed part is not larger than the maximum value of the width Wa of a projected part, and the height Ha of a projected part is not larger than the height Hb of a depressed part. When the shapes of a projected part and a depressed part are related to each other as described above, contact of the top of the projected part 3A with the bottom of the depressed part 3B is prevented, a decrease in water permeability performance at the bottom of the depressed part 3B to be caused by fretting is prevented and, as a result, a decrease in water permeability performance of the deformed porous hollow fiber membrane 1 is inhibited. Furthermore, in terms of moisturizer holding capacity, with such shapes, the influence of the membranes rubbing against each other during transportation and the like to remove moisturizers held on the membrane surface is smaller, and therefore it is possible to exhibit further higher drying resistance.

The asperity number on the periphery of the deformed porous hollow fiber membrane 1, which is the number of the projected and depressed parts, is preferably not smaller than 1 and not larger than 300. When it is not smaller than 1, it is possible to prevent adhesion and deposition of an inorganic substance and/or an organic substance onto the membrane surface by generating a complicated flow in the vicinity of the membrane surface, and when it is not larger than 300, it is possible to accurately form protrusions on the periphery of the hollow fiber porous membrane. More preferable is not smaller than 8 and not larger than 200, and further preferable is not smaller than 12 and not larger than 150.

The shape of an asperity is not particularly limited and examples of which include various shapes such as a convex type and a concave type.

Figure 4:
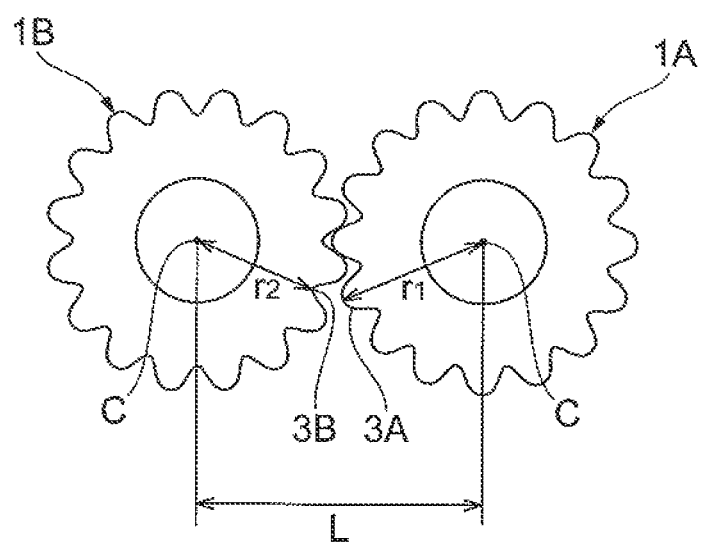
FIG. 4 is a scheme view of a three-dimensional network structure of the deformed porous hollow fiber membrane according to the embodiment of the present invention.

As shown in FIG. 4, as for the asperities to be formed on the periphery of the deformed porous hollow fiber membrane 1, the sum of the length r1 from the center C of the deformed porous hollow fiber membrane 1 (1A,1B) to the top of the projected part 3A and the length r2 from the center C of the deformed porous hollow fiber membrane 1 (1A,1B) to the bottom of the depressed part 3B is preferably smaller than the center-to-center distance L between the porous hollow fiber membranes 1A and 1B adjacent to each other. According to this, even if the deformed porous hollow fiber membranes 1 adjacent to each other nib against each other due to vibration or the like, contact of the top of the projected part 3A with the bottom of the depressed part 3B is prevented. Therefore, the fretting resistance of the deformed porous hollow fiber membrane 1 is enhanced, a decrease in water permeability performance at the bottom of the depressed part 3B to be caused by fretting is prevented and, as a result, a decrease in water permeability performance of the deformed porous hollow fiber membrane 1 is inhibited.

It is possible to measure the distance from the center C of the projected part 3A of the deformed porous hollow fiber membrane 1 to the top of the projected part 3A, the distance from the center C of the deformed porous hollow fiber membrane 1 to the bottom of the depressed part 3B, and the center-to-center distance L between the deformed porous hollow fiber membranes 1, as follows. First, two microscope photographs of cross sections of the hollow fiber membranes are prepared. The magnification of the photographs may be a magnification at which entire cross sections of the membranes are visible. As these two photographs of cross sections of the membranes, identical photographs may be used, or photographs showing different parts may be used as long as the membranes have substantially the same structures in the longitudinal direction. These two photographs are stuck to cardboard at their back sides, and are cut along the peripheries of the membranes with scissors to be used in place of actual cross sections of the membranes. For the center-to-center distance, the point of intersection among the longer diameter and the shorter diameter among the inner diameters is used as the center point in each cross section of the membrane. The two cross sections of the membranes (the pieces cut out from the photographs) are rotated to determine the arrangement in which the distance between the two center points is the minimum, and subsequently the center-to-center distance is actually measured with a ruler. After that, conversion to the actual distance is made based on the magnifications of the photographs to determine the center-to-center distance L. In addition, on the same photographs, the length r1 from the center point to a projected part (namely, the point farthest from the center point) and the length r2 from the center point to a depressed part (the point on the periphery closest to the center point) are measured to compare the lengths of the center-to-center distance L and the sum of r1 and r2. The measurement above can be suitably made even in the case of small membranes. Unless there is a problem such as that the hollow fiber membrane is too small to handle and the like, it is suitable to cut out two pieces of actual cross sections of the membranes as thin slices to be measured with a microscope.

The value resulting from dividing the center-to-center distance L by the sum of r1 and r2 is preferably not smaller than 1.01 and not larger than 1.50, more preferably not smaller than 1.03 and not larger than 1.25, and most preferably not smaller than 1.05 and not larger than 1.15. When the value resulting from dividing the center-to-center distance L by the sum of r1 and r2 is not larger than 1.50, a bundle to be packed inside a membrane module is not too thick and, as a result, it is possible to secure an economically adequate membrane packing rate.

When the above relationships for cross sections vertical to the longitudinal direction are satisfied at any position along the longitudinal direction of the deformed porous hollow fiber membrane 1, improvement in fretting resistance and improvement in water permeability performance of the deformed porous hollow fiber membrane 1 are remarkable.

In order to improve the strength of the deformed porous hollow fiber membrane 1, an arrangement having a layer for supporting the porous body and/or a support such as braid on the inner face side of the aperture 2 of the deformed porous hollow fiber membrane 1 may be considered. When the deformed porous hollow fiber membrane 1 is a multi-layered membrane, the thickness of the outermost layer that has asperities may be uniform, or the thickness of a region in which a projected part is formed may be larger or smaller than the thickness of a region in which a depressed part is formed.

(Thermoplastic Resin)

The thermoplastic resin (thermoplastic polymer) that constitutes the deformed porous hollow fiber membrane 1 is a resin with properties of being less likely to be deformed and having elasticity and no plasticity at normal temperature, of undergoing a reversible change in which it exhibits plasticity with adequate heat applied to become easier to be formed and transforms back into an elastic body when it is cooled to have a low temperature, and of not undergoing a chemical change in its molecular structure or the like during the reversible change (edited by editorial committee of Encyclopedia Chimica, Encyclopedia Chimica, 6th Reduced edition, Kyoritsu Shuppan Co., Ltd., pp. 860 and 867, 1963).

Examples of the thermoplastic resin can include the resins described in 14705 of Chemical Products (The Chemical Daily Co., Ltd., 2005) under the category of thermoplastics (pp. 1069 to 1125), the resins described in Kagaku Binran Ouyou Hen (Handbook of Chemistry Application Version), 3rd Revision (edited by The Chemical Society of Japan, Maruzen Company, Limited, 1980), pp. 809-810, and the like. Examples of the specific name thereof include polyethylene, polypropylene, polyvinylidene fluoride, ethylene-vinyl alcohol copolymers, polyamides, polyether imides, polystyrene, polysulfone, polyvinyl alcohol, polyphenylene ether, polyphenylene sulfide, cellulose acetate, and polyacrylonitrile. Among them, polyethylene, polypropylene, polyvinylidene fluoride, ethylene-vinyl alcohol copolymers, polyvinyl alcohol, and the like having crystallinity can be suitably used in terms of strength to be exhibited. Furthermore, among these crystalline thermoplastic resins, hydrophobic crystalline thermoplastic resins including polyolefins such as polyethylene and polypropylene, and polyvinylidene fluoride, which are high in water resistance due to their hydrophobicity and can be expected to exhibit durability on filtration of ordinary aqueous liquid can be more suitably used. Furthermore, among these hydrophobic crystalline thermoplastic resins, polyvinylidene fluoride, which is excellent in chemical durability such as chemical resistance, can be particularly suitably used. Examples of the polyvinylidene fluoride include vinylidene fluoride homopolymers, and vinylidene fluoride copolymers with vinylidene fluoride ratios of not lower than 50 mol %. Examples of the vinylidene fluoride copolymer can include copolymers of vinylidene fluoride and one or more species selected from tetrafluoroethylene, hexafluoropropylene, chlorotrifluoroethylene, and ethylene. As the polyvinylidene fluoride, vinylidene fluoride homopolymers are most preferable.

(Porous Structure)

(Isotropic Three-Dimensional Network Structure)

The deformed porous hollow fiber membrane 1 according to the embodiment of the present invention is formed from a porous membrane having an isotropic three-dimensional network structure. Isotropic means to have a uniform structure that is small in pore size variation in the thickness direction of the membrane and in the longitudinal direction of the membrane and includes no macrovoid. This structure is distinctly different from a structure that is orientated in the longitudinal direction of the membrane as typically found on drawing aperture formation, and from a structure with great pore size variation in the direction of a cross section of the membrane and including macrovoids, which are often found in non-solvent induced phase separation. With such a uniform structure, it is possible to efficiently use the surfaces of both the depressed part and the projected part at the time of filtration. In addition, parts that are low in strength such as macrovoids are less likely to be created, and therefore it is possible to enhance the mechanical strength of the porous hollow fiber membrane such as the pressure resistance while maintaining the water permeability.

Isotropic refers to satisfying both of that (1) no void with a diameter of not smaller than 10 μm exists in a cross section in the direction of the membrane circumference, and that (2) (a pore size in the longitudinal direction of the membrane)/(a pore size in the thickness direction of the membrane) (hereinafter, referred to as a degree of orientation) in a cross section in the longitudinal direction of the membrane is small. When the degree of orientation is within the range of 0.25 to 4.0 and no void is included, this may be said to be isotropic. Having such a degree of orientation, the deformed porous hollow fiber membrane 1 can exhibit high water permeability and durability as described above.

The degree of orientation is more preferably 0.3 to 3.0 and further preferably 0.5 to 2.0. Measurement methods of the degree of orientation are not particularly limited and appropriate methods may be used. For example, as described in International Publication No. WO 2001/53213, a transparent sheet is overlaid on a copy of an electron microscope image of a cross section of a deformed porous hollow fiber membrane in the longitudinal direction of the membrane, a pore part is filled in with black using a black pen or the like, and subsequently the transparent sheet is duplicated onto a piece of white paper so as to distinctly differentiate the pore part as black from a non-pore part as white and then determine the degree of orientation using commercially available image analyzing software. As the electron microscope image to be used in the measurement, an image the center of which is the central part of a membrane thickness portion is used unless there is a specific problem.

Figure 5:
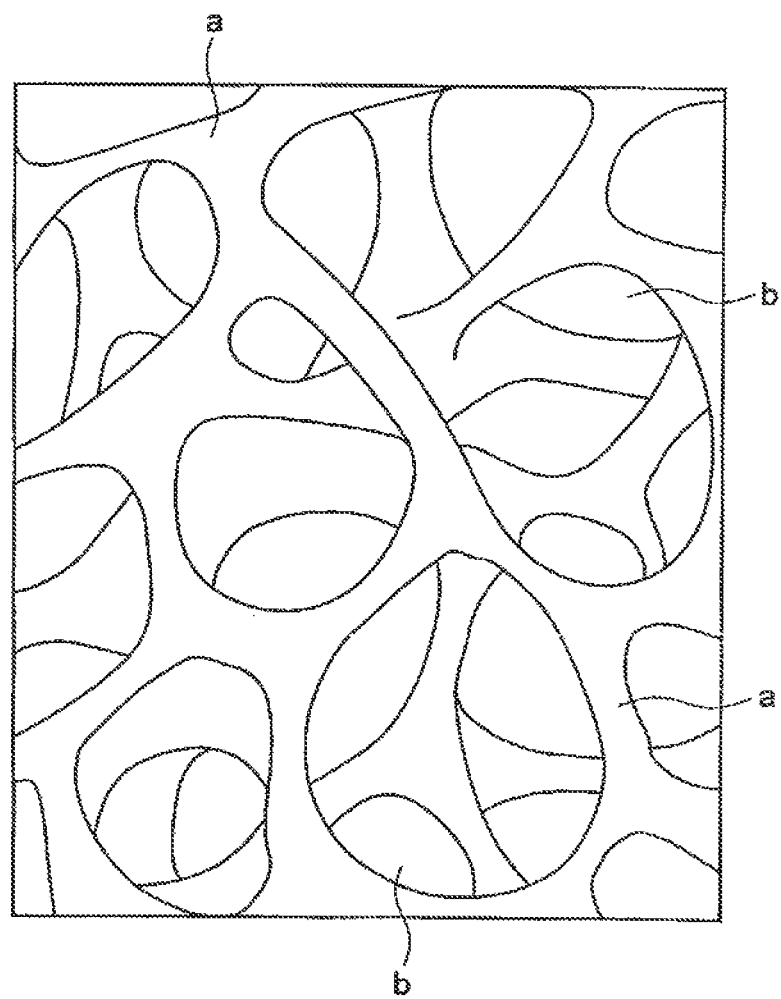
FIG. 5 is a scheme view of a three-dimensional network structure of the deformed porous hollow fiber membrane according to the embodiment of the present invention.
Figure 6:
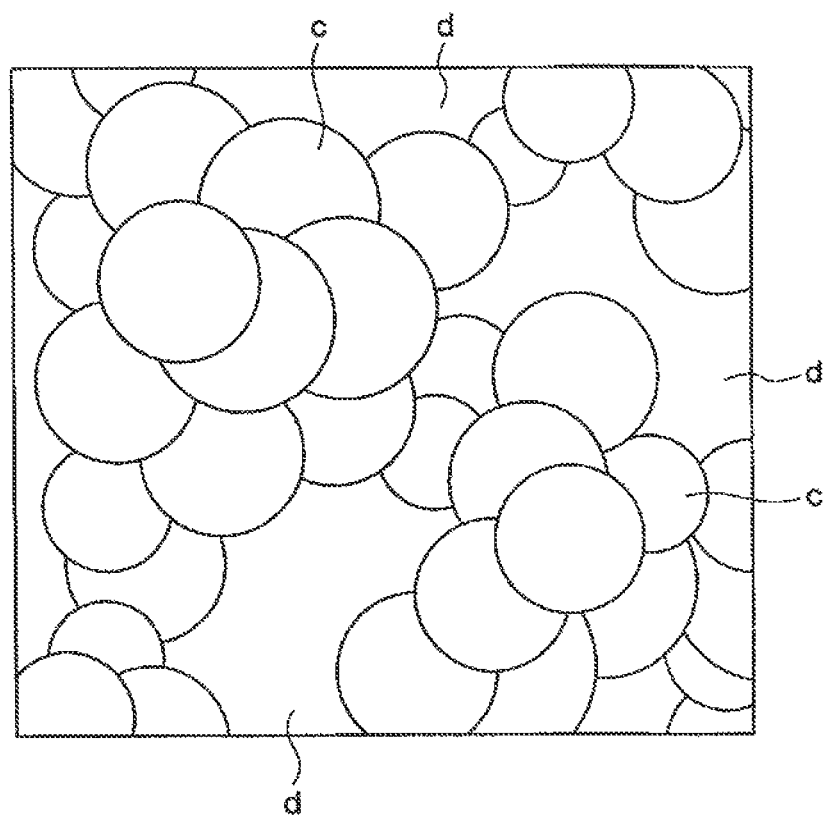
FIG. 6 is a scheme view of a spherical structure of the deformed porous hollow fiber membrane according to the embodiment of the present invention.

The three-dimensional network structure described herein refers to a structure in which resins form an unlimited number of columns the both ends of which join together to form a three-dimensional structure. In the three-dimensional network structure, almost all the resins contribute to form columns, and resin lumps, which are found in a so-called spherical structure in an unlimited number, are hardly visible. A cavity part of the three-dimensional network structure is surrounded by the thermoplastic resin columns, and each portion of the cavity part communicates with each other. In this way, almost all the resins being used contribute to form columns that can contribute to the strength of the hollow fiber membrane, and therefore it is possible to form a membrane high in strength. In addition, the chemical resistance improves. Though the reason for the improvement in chemical resistance is not clear, it is considered that large number of columns can contribute to the strength and therefore, when a part of the columns is attacked by chemical agents, the overall strength of the membrane is not largely affected. On the other hand, in a spherical structure, resins gather to form lumps to render the number of the columns relatively smaller and therefore render the strength lower. For this reason, it is considered that, when a part of the columns is attacked by chemical agents, the overall strength of the membrane is likely to be affected. By forming such an isotropic three-dimensional network structure, it is possible to maintain high strength even at a projected part and, as a result, deformation of a projected part does not occur during use to make it possible to maintain the shape of an asperity in a long-term use. A scheme view of an isotropic three-dimensional network structure is shown in FIG. 5. As shown in FIG. 5, columns a join to form a cavity part b. For reference, a scheme view of a spherical structure is shown in FIG. 6. As shown in FIG. 6, spherulites c are densely packed in part, and spaces between the spherulites c-densely-packed parts are cavity parts d.

(Surface Pore Ratio)

Furthermore, as a result of the research made by the present inventors, in the deformed porous hollow fiber membrane 1, the surface pore ratio of the depressed part 3B on the periphery that is higher than the surface pore ratio of the projected part 3A has been proved to be preferable in terms of expressing high filtration performance and inhibiting a decrease, in a long-term use, in water permeability performance that is caused by fretting. The depressed part 3B described herein is a region the center of curvature of which is outside the deformed porous hollow fiber membrane 1, which is the region shown by the arrows in FIG. 3. The projected part 3A is a region the center of curvature of which is inside the deformed porous hollow fiber membrane 1, which is the region surrounded by the depressed part 3B in FIG. 3. Though the reason why the surface pore ratio of the depressed part 3B on the periphery that is higher than the surface pore ratio of the projected part 3A inhibits the decrease in water permeability performance is not clear, it is considered to be important that the pore ratio of the depressed part 3B that is higher than that of the projected part 3A causes improvement in pore ratio throughout the membrane surface, and further causes a situation in which not all the membrane surfaces are used for filtration at the same time and whereby the surface to be used in filtration shifts over time from the depressed part with a high pore rate to a part of the projected part with a relatively low pore rate.

The depressed part 3B is, as described above, a surface that is high in recovery after washing on air scrubbing or shearing and also is less prone to fretting. Therefore, it is considered that the depressed part preferably has a higher pore rate, namely high water permeability performance, to make it possible to maintain higher water permeability performance throughout the membrane surface for an extended period of time. It is possible to determine the surface pore ratio of the deformed porous hollow fiber membrane 1 by measuring the area ratio of a pore part using image analyzing software as in the case of the measurement of the degree of orientation above. As the electron microscope photographs to be used in the measurements of a depressed part and a projected part, electron microscope photographs of the bottom-most part of a depressed part and the top of a projected part are used. The ratio of the surface pore ratio of a depressed part to the surface pore ratio of a projected part is preferably not lower than 1.01 and not higher than 2.00. When it is not lower than 1.01, it is possible to exhibit high water permeability performance, and when it is not higher than 2.00, not only the depressed part but also the projected part are used for filtration to give the effect of an asperity to improve the outer surface area, whereby it is possible to exhibit high water permeability performance. More preferable is not lower than 1.08 and not higher than 1.80, and further preferable is not lower than 1.10 and not higher than 1.50.

The pore ratio of each of the projected and depressed parts may be suitably determined depending on the purpose and is not particularly limited. From the viewpoint of filtration consistency for fluid to be treated containing suspended substances and the like, it is preferably not lower than 20%, more preferably not lower than 23%, and further preferably not lower than 25%. From the viewpoint of enhancing the mechanical strength of the surface part, the pore ratio is preferably not higher than 80%. More preferable is not higher than 70%, and further preferable is not higher than 60%.

(Proportion of Depressed Part)

The deformed porous hollow fiber membrane 1 of the embodiment of the present invention preferably has a proportion of depressed part to the total length of the periphery of as high as possible within the range not impairing the fretting resistance. The depressed part described herein is the region shown by the arrows in FIG. 3 as mentioned above, and a large number of the depressed parts with higher pore ratios make it possible to express high water permeability performance and fretting resistance. In addition, the fact that moisturizers are likely to be held at the depressed part, which has a higher pore ratio (namely a larger number of pores) and is prone to dry, is preferable in terms of drying resistance as well. The proportion of depressed part varies depending on the number of asperities or the height and the width of an asperity. The proportion of depressed part to the total length of the periphery is preferably not lower than 5% and not higher than 90%, more preferably not lower than 10% and not higher than 80%, and further preferably not lower than 15% and not higher than 70%.

In the case of deformed porous hollow fiber membranes to be used in dialysis disclosed as in Patent Document 4 and the like in which protrusions are provided for the purpose of preventing threads to adhere tightly each other, the number of protrusion parts that are formed dense and low in permeability by non-solvent phase separation is preferably as small as possible within the range not impairing the effect. As a result, a membrane in which protrusions are provided to a part of its ordinary annular periphery is common. On the contrary, in the case of the deformed porous hollow fiber membrane 1 according to the embodiment of the present invention that has isotropic network structures throughout the membrane, a decrease in water permeability performance contributed by protrusions is relatively small, or rather the membranes are less likely to rub against each other at the depressed portions. Therefore, a high proportion of depressed part to the length of the periphery is preferable because it is possible to maintain high water permeability performance for an extended period of time. In addition, although the reason for that is not clear, the recovery after washing on membrane surface shearing is high at the time of air scrubbing or cross-flow filtration, and therefore it is possible to exhibit higher water permeability performance.

(Surface Pore Size)

As for the pore size in the outer surface of the deformed porous hollow fiber membrane 1, the value resulting from dividing the surface pore size in a depressed part by the surface pore size in a projected part is preferably not smaller than 0.5 and not larger than 2.0. More preferable is not smaller than 0.7 and not larger than 1.5, and further preferable is not smaller than 0.8 and not larger than 1.3. When the proportion of the surface pore size in a depressed part to the surface pore size in a projected part is not lower than 0.5 and not higher than 2.0, pore size distribution throughout the membrane is adequately small and it is possible to exhibit high rejection performance. In addition, it is preferable because the values of the filtration resistance of a projected part and the filtration resistance of a depressed part are close and therefore it is possible to efficiently use both of the projected part and the depressed part for filtration.

As for the pore shape in the outer surface of the deformed porous hollow fiber membrane 1, the aspect ratio of a pore on the outer surface is preferably not lower than 0.3 and not higher than 3.0. The aspect ratio of a pore on the outer surface that is not lower than 0.3 is preferable because, when stress is applied in the longitudinal direction of the hollow fiber in air scrubbing and the like, the outer surface that is a rejection layer does not crack and therefore can maintain excellent rejection performance for an extended period of time. The aspect ratio of a pore on the outer surface that is not higher than 3.0 is preferable because, in the case of sway in the direction of the membrane circumference in air scrubbing and the like, a decrease in water permeability performance due to fretting is inhibited. The aspect ratio of a pore on the outer surface is more preferably not lower than 0.4 and not higher than 2.5, and further preferably not lower than 0.5 and not higher than 2.0. The aspect ratio of a pore on the outer surface described herein refers to (a surface pore size in the longitudinal direction of the hollow fiber)/(a surface pore size in the direction of the circumference of the hollow fiber) in the outer surface of the deformed porous hollow fiber membrane 1. The outer surface of the deformed porous hollow fiber membrane 1 is constituted to include a projected part, a depressed part, and a circumferential part, and all of these preferably fall within the range of the above aspect ratio. As for fretting, the deformed porous hollow fiber membrane 1 sways in the direction of the circumference of the hollow fiber membrane at the time of air scrubbing, and therefore the influence of fretting in this direction is great. Because of that, when the pore size of a pore on the outer surface in the direction of the circumference is small, the influence of pore blockage is great, and therefore a decrease in water permeability performance is likely to occur. It is possible to determine the aspect ratio of a pore on the outer surface from the arithmetic mean of aspect ratio of each pore using image analyzing software as in the case of the measurement of the degree of orientation above. When the pore size is 0.1 μm to about 1 μm, it is appropriate to use an electron microscope image at a magnification of about 5000 times.

As for the pore shape in the inner surface of the aperture 2 of the deformed porous hollow fiber membrane 1, the aspect ratio is preferably not lower than 0.25 and not higher than 4.0 in terms of expressing mechanical strength. When the aspect ratio of a pore on the inner surface is not lower than 0.25, it is possible to obtain adequate strength in the longitudinal direction of the hollow fiber membrane, namely it is possible to enhance the tensile strength, and when it is not higher than 4.0, it is possible to enhance the strength in the membrane-thickness direction of the hollow fiber membrane, namely the compressive strength and the burst strength that are important mechanical strength in outside-in filtration. The aspect ratio of a pore on the inner surface is more preferably not lower than 0.3 and not higher than 3.0, and further preferably not lower than 0.5 and not higher than 2.0. When the deformed porous hollow fiber membrane 1 is composed of one layer, it is possible to determine the aspect ratio of a pore on the inner surface of the aperture 2 using a scanning electron microscope photograph of the inner surface as in the case of the aspect ratio of a pore on the outer surface. When the deformed porous hollow fiber membrane 1 is formed from multilayer, namely when a support and the like are provided, the aspect ratio may be determined using scanning electron microscope photographs of a cross section of the inner face-side surface in the longitudinal direction of the membrane and a cross section in the direction of the membrane circumference, of the membrane that is the outermost layer.

(Average Pore Size and Maximum Pore Size)

The average pore size and the maximum pore size of the deformed porous hollow fiber membrane 1 is preferably 0.01 to 10 μm. When the average pore size and the maximum pore size are not smaller than 0.01 μm, the filtration resistance of the membrane is low and adequate water permeability performance is obtained, and when it is not larger than 10 μm, a membrane that is also excellent in separation performance is obtained. More preferable is 0.02 μm to 5 μm, and further preferable is 0.05 to 1 μm. When the average pore size and the maximum pore size are not smaller than 0.05 μm, it is preferable to measure the average pore size and the maximum pore size by the method described in ASTM F:316-86. When the average pore size is smaller than 0.05 μm and high pressure is required in the measurement, deformation of the membrane due to high pressure is problematic, and therefore the measurement can be performed by filtrating marker substances with known particle sizes, and determining the particle size of the marker substance for which the rejection is 50% as the average pore size, and the particle size of the marker substance for which that is 1% as the maximum pore size.

In addition, the value resulting from dividing the maximum pore size by the average pore size is preferably not larger than 2.0. The value resulting from dividing the maximum pore size by the average pore size is an indicator showing uniformity in pore sizes of the membrane, and the membrane has more uniform pores as this value is closer to 1. The value resulting from dividing the maximum pore size by the average pore size to be described below increases as the ratio of the surface pore size in a depressed part to that in a projected part described above increases. This is because pore size distribution of a depressed part is different from that of a projected part and therefore pore size distribution throughout the membrane becomes broader. When the value resulting from dividing the maximum pore size by the average pore size is not larger than 2.0, it is possible to obtain high rejection performance. More preferable is not larger than 1.9, and further preferable is not larger than 1.8.

(Porosity)

The porosity of the deformed porous hollow fiber membrane 1 is preferably 20% to 90%. When the porosity of the deformed porous hollow fiber membrane 1 is not lower than 20%, it is possible to obtain a membrane with excellent water permeability performance, and when it is not higher than 90%, it is possible to obtain a membrane with practical strength properties.

In the embodiment of the present invention, it is possible to measure the porosity of the deformed porous hollow fiber membrane 1 by dividing the difference between the mass in a wet condition and the mass in an absolute dry condition of the porous hollow fiber membrane that is impregnated with water in its small pores except for in the hollow part, by the volume of the membrane excluding the hollow part.

(Others)

The inner diameter of the deformed porous hollow fiber membrane 1 (the diameter of the aperture 2) is preferably 0.1 mm to 5 mm. When the inner diameter is not smaller than 0.1 mm, it is possible to control pressure loss that is generated at the time when filtrate water flows through the hollow part to be low, and when it is not larger than 5 mm, it is possible to enhance the membrane packing density per unit volume, and therefore miniaturization can be achieved. More preferable is 0.3 mm to 4 mm, and further preferable is 0.5 mm to 3 mm.

The membrane thickness of the deformed porous hollow fiber membrane 1 is preferably 0.05 mm to 2 mm. When the membrane thickness is not smaller than 0.05 mm, it is possible to obtain adequate compressive strength that is required for a porous hollow fiber membrane for outside-in filtration, and when it is not larger than 2 mm, it is possible to enhance the membrane packing density per unit volume, and therefore miniaturization can be achieved. More preferable is not smaller than 0.1 mm and not larger than 1 mm.

The elongation at break of the deformed porous hollow fiber membrane 1 is preferably not lower than 50%. When the elongation at break is not lower than 50%, the deformed porous hollow fiber membrane 1 has adequate durability against physical washing such as air scrubbing. More preferable is not lower than 80%, and further preferable is not lower than 100%.

<Production Method of Deformed Porous Hollow Fiber Membrane>

Next, examples of preferable production methods of preparing the deformed porous hollow fiber membrane 1 according to the embodiment of the present invention will be described.

(Organic Liquid)

An organic liquid that is a potential solvent for the thermoplastic resin to be used in the present specification is used. In the present specification, the potential solvent refers to a solvent that hardly dissolves the thermoplastic resin at room temperature (25° C.) and can dissolve the thermoplastic resin at a temperature higher than room temperature. It has to be liquid only at fusion kneading temperature for both of the thermoplastic resin and itself, and is not necessarily required to be liquid at normal temperature.

When the thermoplastic resin is polyethylene, examples of the organic liquid can include phthalate esters such as dibutyl phthalate, diheptyl phthalate, dioctyl phthalate, di(2-ethylhexyl) phthalate, diisodecyl phthalate, and ditridecyl phthalate; sebacic acid esters such as dibutyl sebacate; adipic acid esters such as dioctyl adipate; trimellitic acid esters such as trioctyl trimellitate; phosphate esters such as tributyl phosphate and trioctyl phosphate; glycerin esters such as propylene glycol dicaprate and propylene glycol dioleate; paraffins such as liquid paraffins; and a mixture thereof.

When the thermoplastic resin is polyvinylidene fluoride, examples of the organic liquid can include phthalate esters such as dimethyl phthalate, diethyl phthalate, dibutyl phthalate, dicyclohexyl phthalate, diheptyl phthalate, dioctyl phthalate, and di(2-ethylhexyl) phthalate; benzoate esters such as methyl benzoate and ethyl benzoate; phosphate esters such as triphenyl phosphate, tributyl phosphate, and tricresyl phosphate; ketones such as α-butyrolactone, ethylene carbonate, propylene carbonate, cyclohexanone, acetophenone, and isophorone; and a mixture thereof.

(Inorganic Fine Powder)

Examples of inorganic fine powder include silica, alumina, titanium oxide, zirconia oxide, and calcium carbonate, and fine silica powder with an average primary particle size of not smaller than 3 nm and not larger than 500 nm is particularly preferable. More preferable is not smaller than 5 nm and not larger than 100 nm. Hydrophobic silica fine powder that is less likely to aggregate and is excellent in dispersibility is more preferable, and hydrophobic silica with a MW (methanol wettability) value of not lower than 30% by volume is further preferable. The MW value described herein is the value in % by volume of methanol that completely wets the powder. Specifically, the MW value is determined by placing silica in deionized water and, when adding methanol below the fluid level while stirring, obtaining the value in % by volume of methanol in the aqueous solution at the time where 50% by mass of the silica precipitates.

As for the addition amount of the inorganic fine powder, the mass ratio of the inorganic fine powder in a fusion kneaded product is preferably not lower than 5% by mass and not higher than 40% by mass. When the proportion of the inorganic fine powder is not lower than 5% by mass, the effect of kneading-in the inorganic fine powder can be fully expressed, and when it is not higher than 40% by mass, it is possible to spin consistently.

As for the mixing proportion in fusion kneading, the ratio of volume that is obtained by dividing mass by specific gravity is preferably within the range of 15% by volume to 50% by volume for the thermoplastic resin and within the range of 50% by volume to 85% by volume for the total of the organic liquid and the inorganic fine powder, in terms of the balance between the water permeability performance and the strength of the hollow fiber to be obtained and in terms of consistency in the spinning process that is a melt extrusion process. As for the thermoplastic resin, it is preferably not lower than 15% by volume in terms of the strength of the porous multi-layered hollow fiber membrane to be obtained and of spinning consistency. It is preferably not higher than 85% by volume in terms of the water permeability performance of the porous multi-layered hollow fiber membrane to be obtained and of spinning consistency.

Addition of inorganic fine powder has the following three advantages.

(1) Surprisingly, by discharging a fusion kneaded product to which inorganic fine powder is added through a deformed outlet to obtain a deformed porous hollow fiber membrane, the surface pore rate of depressed part on the outer surface largely improves compared to the case of the outer surface of an ordinary perfect circle hollow fiber membrane. Though the reason for that is not clear, it is assumed the fact that inorganic fine powder exists on the outer surface of a depressed part, namely a region the center of curvature of which is outside the periphery of the deformed porous hollow fiber membrane, affects the improvement in pore rate.

(2) Because of the thickening effect of inorganic fine powder, a membrane having an isotropic three-dimensional network structure is likely to be obtained and, as a result, it is possible to exhibit high mechanical strength.

(3) On preparing a deformed porous hollow fiber membrane according to the embodiment of the present invention, the molding consistency significantly decreases as the height or the number of asperities increases and therefore it is difficult to obtain a porous hollow fiber membrane having enough projected and depressed parts on the periphery. However, by adding inorganic fine powder, the viscosity of the fusion kneaded product increases and the molding consistency significantly improves. As a result, it is possible to easily obtain a deformed porous hollow fiber membrane that is high in proportion of depressed part on the periphery of the membrane.

(Viscosity of Fusion Kneaded Product)

The viscosity of the fusion kneaded product on discharge is preferably within the range of 1 Pa·sec to 1000 Pa·sec. When it is not lower than 1 Pa·sec, it is possible to precisely obtain the desired asperity shape, and when it is not higher than 100 Pa·sec, it is possible to discharge the fusion kneaded product consistently. As the method of improving the viscosity, addition of inorganic fine powder to the fusion kneaded product is preferable. Generally, in order to increase the viscosity, increasing polymer concentration or using a polymer with a high molecular weight is often performed. However, porosity that contributes to filtration decreases in the former case, and problems such as defective molding are likely to occur in the latter case. By adding inorganic fine powder, it is possible to improve the viscosity of the fusion kneaded product without limitation of the molecular weight and the concentration of polymers so as to inhibit deformation of the asperity shape while the fusion kneaded product is in an air gap after being discharged through the outlet and before being cooled and, as a result, it is possible to obtain a deformed porous hollow fiber membrane consistently. The viscosity on discharge can be obtained by, using a capillograph, measurement at the actual shear rate (shear speed) at the time of discharge through an outlet. The viscosity of the fusion kneaded product on discharge is more preferably not lower than 2 Pa·sec and not higher than 800 Pa·sec, and further preferably not lower than 5 Pa·sec and not higher than 600 Pa·sec.

(Methods of Fusion Kneading and Extrusion)

As for the mixing proportion in fusion kneading, the ratio of volume that is obtained by dividing mass by specific gravity is preferably within the range of 15% by volume to 50% by volume for the thermoplastic resin and within the range of 50% by volume to 85% by volume for the total of the organic liquid and the inorganic fine powder, in terms of the balance of the hollow fiber to be obtained between the water permeability performance and the strength, and consistency in the spinning process that is a melt extrusion process. As for the thermoplastic resin, it is preferably not lower than 15% by volume in terms of the strength of the porous hollow fiber membrane to be obtained and of spinning consistency. It is preferably not higher than 50% by volume in terms of the water permeability performance of the deformed porous hollow fiber membrane to be obtained and of spinning consistency.

Fusion kneading of the thermoplastic resin with the organic liquid and the inorganic fine powder can be performed using ordinary fusion kneading means such as a twin screw extruder.

Figure 7:
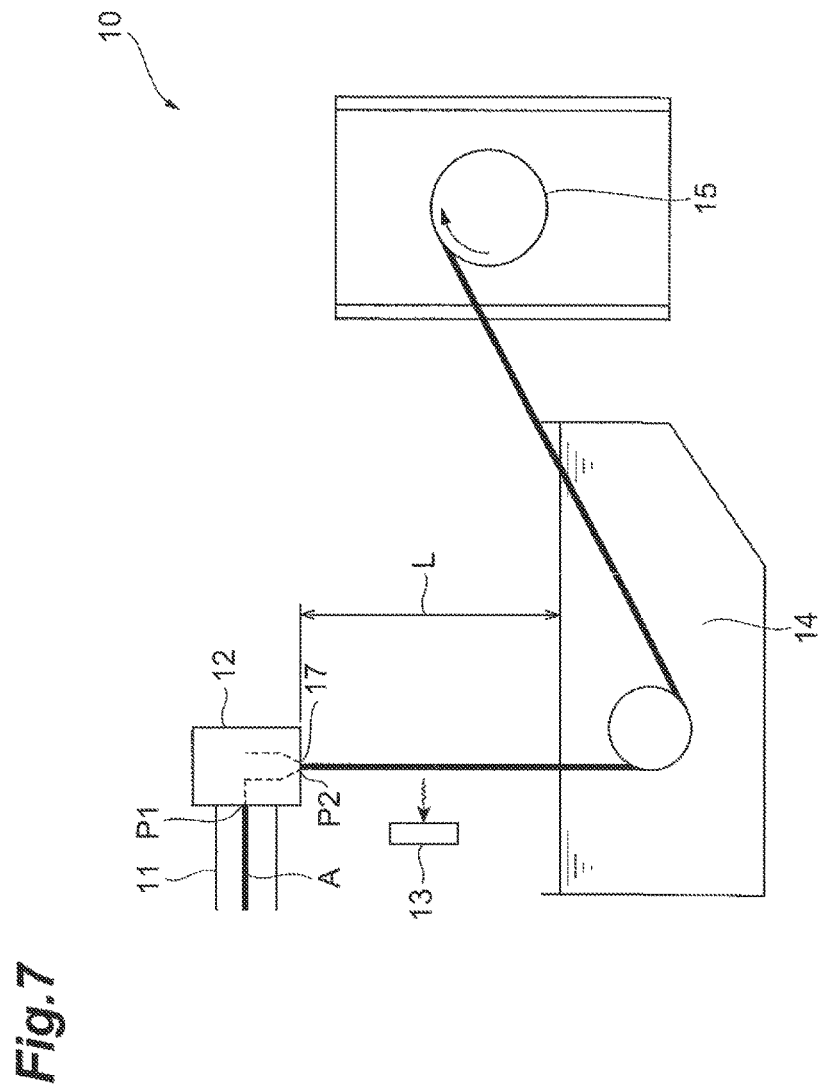
FIG. 7 is a schematic representation of an arrangement of a hollow fiber membrane-forming device according to a production method of the deformed porous hollow fiber membrane according to the embodiment of the present invention.
Figure 8:
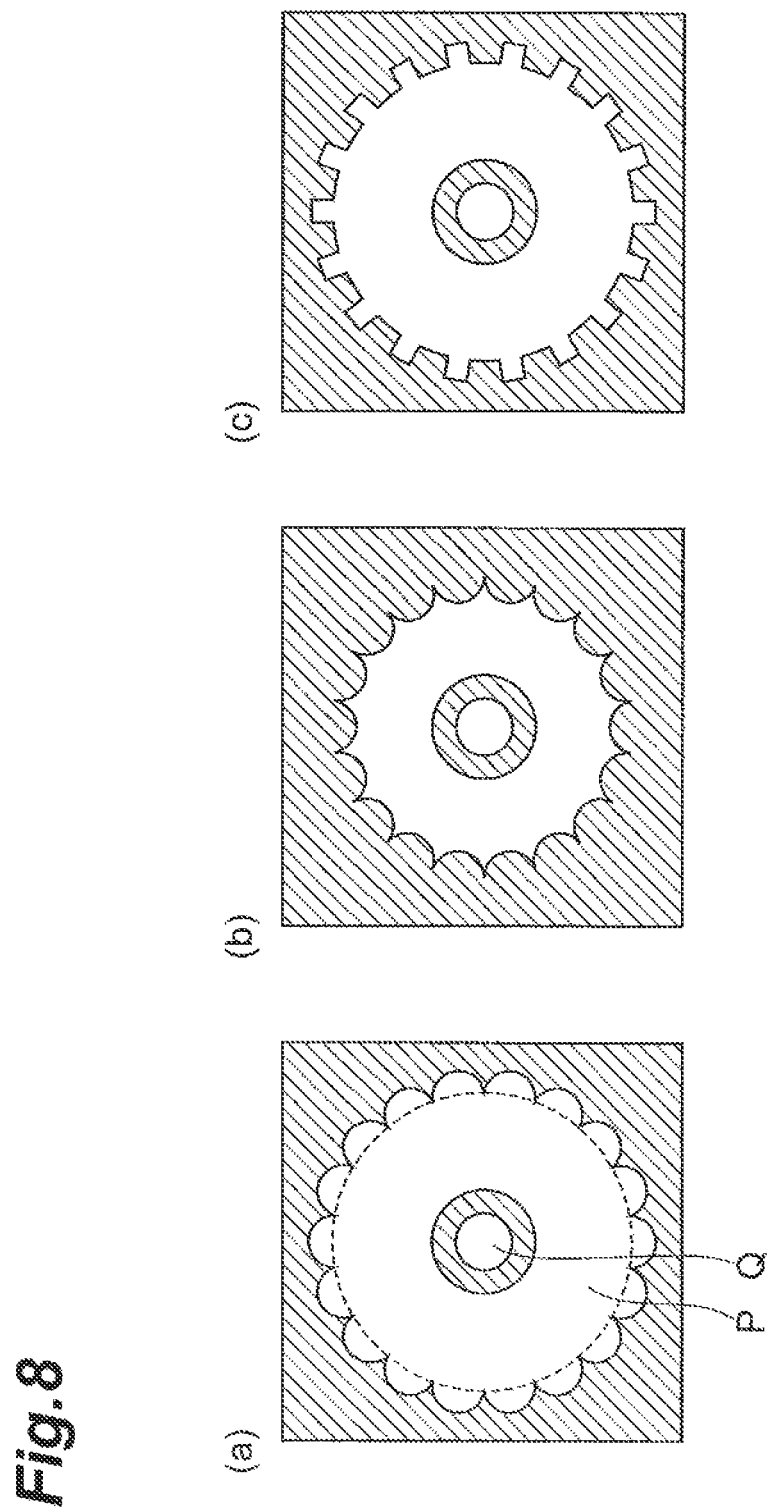
FIG. 8 is a scheme view showing an example of a hollow fiber-forming deformed nozzle for producing the deformed porous hollow fiber membrane according to the embodiment of the present invention.

Scheme views of a hollow fiber membrane-producing device the arrangement of which includes a hollow fiber-forming nozzle are shown in FIG. 7 and FIG. 8. FIG. 7 is a schematic representation of an arrangement of the hollow fiber membrane-producing device, and FIG. 8 shows an example of an orifice of the hollow fiber-forming nozzle. A hollow fiber membrane-producing device 10 shown in FIG. 7 is constituted to include an extruder 11, a hollow fiber-forming nozzle 12 (a hollow fiber-forming deformed nozzle), a suction device 13, a cooling bath 14, and a take-up roller 15. In the hollow fiber membrane-producing device 10, a fusion kneaded product A supplied from the extruder 11 is discharged through the hollow fiber-forming nozzle 12 to pass through the air gap while receiving cooling air from the suction device 13, and then undergoes cool bathing in the cooling bath 14. The fusion kneaded product is then solidified, and the hollow fiber-like material thus solidified is taken up with the take-up roller 15.

As for the hollow fiber-forming nozzle 12, the fusion kneaded product supplied from the extruder 11 flows through the space provided inside the extruder 1 and inside the hollow fiber-forming nozzle 12, and is discharged through a ring-shaped, which is not annular, orifice 17 that is provided at the lower end of the hollow fiber-forming nozzle 12. At the same time, hollow part-forming fluid such as air and high boiling liquid passes through a columnar through slot provided at the central part of the hollow fiber-forming nozzle 12, and is discharged downward through the orifice for the hollow part-forming fluid that is not the orifice 17.

The shape of the orifice 17 of the hollow fiber-forming nozzle 12 is not particularly limited provided that it is deformed. "Deformed" herein refers to that the inner periphery and the periphery of a hollow fiber membrane are not concentrical and the surface shape of the periphery is different from the surface shape of the inner periphery. Namely, it is not particularly limited provided that asperities are provided on the outer circumference of the orifice 17. Therefore, for example, it may be a shape in which semicircle projected parts are formed on the outer circumference as shown in FIG. 8 (a), it may be a shape in which semicircle depressed parts are formed on the outer circumference as shown in FIG. 8 (b), or a projected part provided on the outer circumference side may be rectangular as shown in FIG. 8 (c). As for a hollow fiber membrane according to the embodiment of the present invention, the pore rate of depressed part on the periphery of the hollow fiber is particularly high, and therefore a nozzle in which depressed parts or projected parts are arranged tightly without space on the outer circumference is more preferable so as to increase depressed parts of the deformed porous hollow fiber membrane that is to be prepared using the hollow fiber-forming nozzle 12. In addition, considering durability that does not allow projected and depressed parts of the porous hollow fiber membrane to be scraped or broken during the actual use in filtration, the orifice 17 in which semicircle projected parts are formed sticking out outwardly on the outer circumference as shown in FIG. 8 (a) is most preferable.

As for the discharge of the fusion kneaded product through the hollow fiber-forming nozzle 12, the resin temperature Te on discharge from the extruder 11, namely at a position P1 in FIG. 7, is preferably higher than the resin temperature Ts on discharge through the orifice 17 (outlet), namely at a position P2 in FIG. 7. By discharging with such resin temperature profiles, the temperature of the outer surface of the fusion kneaded product to be discharged is low and, as a result, it is possible to obtain a hollow fiber membrane having high formability of asperities and having a high surface pore rate of depressed part. Furthermore, Te and Ts are preferably higher than the torque inflection temperature Tp of the fusion kneaded product measured with a plastomill in order to form a consistent asperity shape, improve the surface pore rate of depressed part, and decrease the difference between the surface pore sizes in a depressed part and in a projected part. The torque inflection temperature is the phase separation temperature of the fusion kneaded product containing silica. The torque inflection temperature can be measured by the following method, for example. Namely, a fusion kneaded product (once solidified) is kneaded with a plastomill at a temperature not lower than the melting point (about 190° C. in the case of a polyvinylidene fluoride resin, as a guide) to melt uniformly, and then the temperature is raised to incorporate organic liquid with the thermoplastic resin, thereby increasing the torque. When the temperature exceeds a certain temperature, the organic liquid and the thermoplastic resin incorporate uniformly, subsequently a decrease in viscosity of the thermoplastic resin becomes predominant and, on the other hand, the torque decreases. At this point, the temperature at which the torque is the maximum is referred to as the torque inflection temperature.

When both of the resin temperature Te on discharge from the extruder 11 and the resin temperature Ts on discharge through the orifice 17 (outlet) are not lower than the torque inflection temperature, it is possible to obtain, with excellent formability, a deformed porous hollow fiber membrane that is high in quality without defects due to aggregated silica contaminants and the like, is uniform in the pore size at a cross section, and has high compressive strength, a high surface pore rate of depressed part, and a small pore size distribution (namely high rejection performance). The resin temperature Tm and the resin temperature Ts are more preferably higher than the torque inflection temperature Tp by 5° C. or more, and further preferably by 10° C. or more, from the viewpoint of suitably expressing the above effects.

The pressure at the tip of the hollow fiber-forming nozzle at the time of discharging the fusion kneaded product is preferably not lower than 100 kPa and not higher than 900 kPa. In ordinary spinning, although the shape of a hollow fiber membrane is defined by the shape of a hollow fiber-forming nozzle having asperities at the tip part of the outlet, when the pressure at the tip is not enough, resins are not adequately distributed to the projected and depressed parts (in particular, the part to form a projected part of the hollow fiber) of the nozzle. In this case, as a result, only small asperities relative to the asperity shape of the nozzle for discharging through an outlet are provided to the hollow fiber membrane. Namely, a membrane in which a depressed part is shallow, a projected part is low, and the top of the projected part and the bottom part of the depressed part on the periphery of the membrane come into contact with each other is likely to be obtained. As for the pressure loss at the discharge tip part, although the actual calculation thereof is complicated, it is possible to suitably use, within the scope of the present invention, the value that is calculated in an abbreviated manner from the equivalent diameter of an annular channel, flow speed on discharge, and melt viscosity of resin, as described in Examples. A pressure at the nozzle tip part of not lower than 100 kPa is preferable for forming a suitable asperity shape in which the bottom part of a depressed part and the top of a projected part do not come into contact when the membranes approach to the closest with each other. When it is not higher than 900 kPa, shark-skin (melt fracture) of the surface and a decrease in elongation during spinning do not occur and therefore it is possible to spin consistently. The pressure at the tip is more preferably not lower than 150 kPa and not higher than 800 kPa, and further preferably not lower than 200 kPa and not higher than 600 kPa.

The draft ratio that is resulting from dividing the take-up speed (namely the take-up speed with the take-up roller 15) VL of the porous hollow fiber-like material (the fusion kneaded product that is solidified and from which organic liquid or the like is not extracted) by the linear speed VS on discharge of the fusion kneaded product through the orifice 17 is preferably not lower than 1.1 and not higher than 5.0. When it is not lower than 1.1, it is possible to prepare a deformed porous hollow fiber membrane consistently, and when it is not higher than 5.0, it is possible to obtain a membrane in which a depressed part has a high surface pore rate, the difference between the surface pore sizes in a projected part and in a depressed part is small, and the pore size distribution is small. More preferable is not lower than 1.5 and not higher than 4, and further preferable is not lower than 1.8 and not higher than 3.

A pass through time after the fusion kneaded product is discharged through the hollow fiber-forming nozzle 12 and before it is solidified in the cooling bath 14 may be optionally set in order to adjust the pore size of the membrane and the like, and is preferably 0.1 second to about 2 seconds in order to allow sufficient phase separation to make the membrane to be obtained have enough apertures. Generally, in thermally induced phase separation and non-solvent phase separation in which silica is not added, the viscosity of the material to be discharged is low, and therefore projected and depressed parts disappear when the pass through time is long, however, it is possible to prepare a hollow fiber membrane with a consistent asperity shape by adding silica.

In an air gap L after the discharge through the orifice 17 and before the immersion in the cooling bath 14, cooling air is preferably blown from the direction vertical to the discharging direction in order to improve the surface pore rate of depressed part. Though the reason for that is not clear, it is estimated that the reason for the high pore rate to be exhibited is the effects that, due to the cooling air blown from the direction vertical to the discharging direction, an air pool is generated in a depressed part to suppress evaporation of solvent, or that a depressed part does not receive air directly and therefore blockage of pores on the surface is not likely to occur.

The hollow fiber fusion kneaded product extruded through the orifice 17 (outlet) is cooled and solidified while passing through air or a cooling medium such as water, and is taken up with a reel and the like (corresponding to the take-up roller 15 in FIG. 7) where appropriate. During the cooling, thermally induced phase separation of the hollow fiber-like material is induced. In the hollow fiber-like material after cooled and solidified, a concentrated polymer partial phase and a concentrated organic liquid partial phase exist finely divided. When inorganic fine powder is contained and the inorganic fine powder is fine silica powder, the fine silica powder is unevenly distributed to be more in the concentrated organic liquid partial phase. By extraction removal of the organic liquid from the cooled and solidified hollow fiber-like material, the concentrated organic liquid phase portion becomes an empty hole. Thus it is possible to obtain a deformed porous hollow fiber membrane. The extraction removal of the inorganic fine powder is also preferably performed from the viewpoint of further enhancing the water permeability performance of the membrane to be obtained.

The extraction removal of the organic liquid and the extraction removal of the inorganic fine powder can be performed concurrently provided that the extraction removal of both can be performed with the same solvent. Generally the organic liquid and the inorganic fine powder undergo extraction removal separately.

In the extraction removal of the organic liquid, a liquid suitable for extraction that is miscible with the organic liquid without dissolving or modifying the thermoplastic resin to be used is used. Specifically, it is performed by causing contact using immersion or a similar technique. The liquid is preferably volatile so as to be easily removed from the hollow fiber membrane after extraction. Examples of the liquid include alcohols and methylene chloride. It is possible to use water as the extraction liquid provided that the organic liquid is water soluble.

The extraction removal of the inorganic fine powder is generally performed using aqueous liquid. For example, when the inorganic fine powder is silica, it can be performed by first allowing contact with an alkaline solution to inverse the silica into silicate, and then allowing contact with water for extraction removal of the silicate.

The extraction removal of the organic liquid and the extraction removal of the inorganic fine powder may be performed irrespective of the order. When the organic liquid is immiscible with water, it is rather preferable to perform the extraction removal of the organic liquid first and then perform the extraction removal of the inorganic fine powder. The organic liquid and the inorganic fine powder generally coexist in the concentrated organic liquid partial phase in a miscible manner to make the extraction removal of the inorganic fine powder proceed smoothly, thereby being advantageous.

Thus, it is possible to obtain the porous hollow fiber membrane by the extraction removal of the organic liquid and the inorganic fine powder from the cooled and solidified hollow fiber-like extrudate.

To the hollow fiber-like material after cooled and solidified, it is possible to suitably perform stretching of the hollow fiber-like material in the longitudinal direction at either of the stages (i) before the extraction removal of the organic liquid and the inorganic fine powder, (ii) after the extraction removal of the organic liquid and before the extraction removal of the inorganic fine powder, (iii) after the extraction removal of the inorganic fine powder and before the extraction removal of the organic liquid, and (iv) after the extraction removal of the organic liquid and the inorganic fine powder. In general, on stretching a porous hollow fiber membrane in the longitudinal direction, the porous hollow fiber membrane breaks without stretching to the desired scale when the elongation at break of the hollow fiber membrane is low, and therefore the elongation at break is also important on stretching for enhancing the water permeability. The porous hollow fiber membrane to be obtained by a production method of the present specification is high in elongation at break and can be suitably stretched. By stretching, the water permeability performance of the porous multi-layered hollow fiber membrane improves, as well as the strength in the direction vertical to the longitudinal direction of the hollow fiber, namely the compressive strength and the burst strength, decreases. Thus, the stretch ratio is more preferably not lower than 1.1 times and not higher than 3 times. The stretch ratio described herein refers to the value resulting from dividing the hollow fiber length after stretched by the hollow fiber length before stretched. For example, in the case of stretching a hollow fiber from a hollow fiber length of 10 cm to a hollow fiber length of 20 cm, the stretch ratio is 2 times by the following formula.

20 cm/10 cm=2

Heat treatment may be performed on the membrane after stretched so as to enhance the compressive strength, where appropriate. Generally the heat treatment temperature is suitably not higher than the melting point of the thermoplastic resin.

In order to improve the strength, a production method of bonding a support layer for the porous body and/or a support such as braid on the inner surface side of the porous hollow fiber membrane of the present invention is also a preferable embodiment. The technique of the bonding may be either coextrusion by bonding in a molten state or a method of coating after solidification.

<Module, Filtration Device, and Filtration Method>

The deformed porous hollow fiber membrane 1 thus obtained is used in a hollow fiber membrane module, a filtration device installed with the hollow fiber membrane module, and water treatment (a water treatment method) with the filtration device, and the like.

In the following, the hollow fiber membrane module, a filtration method and the filtration device using the hollow fiber membrane module will be described. As the hollow fiber membrane module, various aspects are envisioned, however, a casing type membrane module for pressure filtration will be described in the following description as an example.

FIG. 9 is a view showing an arrangement of the hollow fiber membrane module. As shown in FIG. 9 (a), a hollow fiber membrane module 20 includes a bundle of the porous hollow fiber membrane 1 (hereinafter, a hollow fiber membrane bundle) 21. The upper end part and the lower end part of the hollow fiber membrane bundle 21 are fixed with fixing parts 22a and 22b. Furthermore, the hollow fiber membrane bundle 21 and the fixing parts 22a and 22b are received in a pipe-like casing 23. In the hollow fiber membrane module 20 having such an arrangement, a fluid to be filtrated L is supplied to between the casing 23 and the hollow fiber membrane bundle 21 from the base (from a downward direction in the figure), the fluid to be filtrated L is filtrated through the deformed porous hollow fiber membrane 1 with pressure applied, and the permeate is transported via a header pipe or the like that is positioned above the hollow fiber membrane module 20. As shown in FIG. 9 (b), on filtration, the fluid to be filtrated L inside the hollow fiber membrane module 20 is filtrated through the deformed porous hollow fiber membrane 1 from the outer surface side toward the inner surface side of the porous hollow fiber membrane 1. Through holes 24 are provided in the fixing parts 22a and 22b for supplying the fluid to be filtrated L and air to between the casing 23 and the hollow fiber membrane bundle 21, and air scrubbing for the hollow fiber membrane bundle 21 is performed in the hollow fiber membrane module 20 by supplying air from the through holes 24.

The module packed with the deformed porous hollow fiber membrane 1 is also envisioned in other aspects, which are not limited to the casing type described above and may be a non-casing type, for example. The cross-sectional shape of the module may be circular as above (a so-called cylindrical module) as well as square (a so-called cassette module) and the like. Raw water that is the fluid to be filtrated may be directly filtrated through the porous hollow fiber membrane 1, or may be filtrated through the deformed porous hollow fiber membrane 1 after pretreatment of adding an oxidizing agent such as coagulants and ozone. The filtration mode (the filtration method) may be a dead-end filtration mode, a cross-flow filtration mode, a pressure filtration mode, or a suction filtration mode. As the operation method, air scrubbing and back pressure washing to be used for removing filtered-out materials deposited on the membrane surface may be performed separately or concurrently. As the liquid to be used in back pressure washing, oxidizing agents such as sodium hypochlorite, chlorine dioxide, and ozone can be suitably used.

Figure 10:
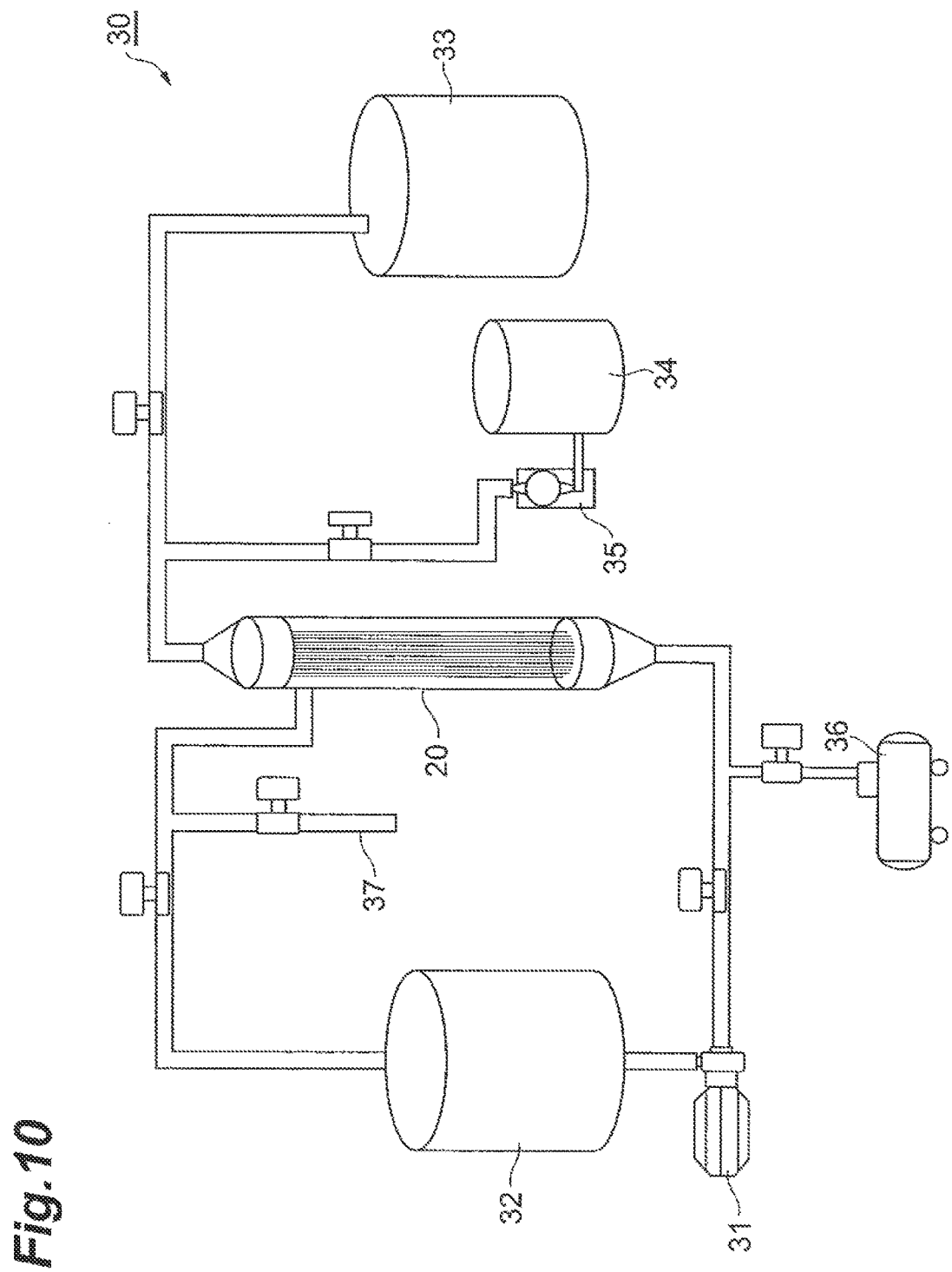
FIG. 10 is a representation of an arrangement of an example of a filtration device for pressure filtration.

Next, the filtration device for pressure filtration will be described. FIG. 10 is a representation of an arrangement of an example of the filtration device for pressure filtration. As shown in this figure, as a filtration device 30, a device provided with a pump 31 for applying pressure on the hollow fiber membrane module 20, a tank 32 for storing the fluid to be filtrated, a tank 33 for storing the filtrate, and also a chemical solution tank 34 and a feed pump 35 to be used in back pressure washing, a pump 36 for supplying air required in air scrubbing, piping 37 for draining waste liquid from air scrubbing and backwash, and the like, where appropriate, can be suitably used.

In the filtration method (the water treatment method) according to the embodiment of the present invention, it is possible to achieve a low cost operation and also a long-term consistent operation by using the hollow fiber membrane module 20, the filtration device 30, and the filtration method, all of which include a large number of the deformed porous hollow fiber membranes 1.

Example 1

In the following, embodiments of the present invention will be specifically described by Examples and Comparative Examples. However, the embodiments of the present invention are not limited to these Examples. Measurement methods to be used in the embodiments of the present invention are as follows. All of the following measurements were performed at 25° C. unless otherwise indicated. In the following, evaluation methods are described, and then production methods and evaluation results in Examples and Comparative Examples are described.

<Evaluation Method>

(1) Torque Inflection Temperature of Fusion Kneaded Product (° C.)

100 g of a fusion kneaded product that was solidified was placed in a Labo-plastomill (manufactured by Toyo Seiki Seisaku-sho, Ltd., model 30C150), and the temperature was raised to 190° C. After the temperature rose, the product was kneaded at 50 rpm for about 10 minutes followed by raising the temperature to 270° C. at a rate of raising temperature of 14° C./minute, and the resin temperature at which the torque was the maximum was defined as the torque inflection temperature.

(2) Resin Temperature Te on Discharge from Extruder (° C.), Resin Temperature Ts on Discharge Through Outlet (° C.)

The resin temperature on discharge from an extruder and the resin temperature on discharge through an outlet were measured by inserting a type K thermocouple thermometer.

(3) Equivalent Radius of Outlet Orifice [mm] The circle equivalent radius was calculated by the following formula according to Kagaku Kogaku—Kaisetsu to Enshu—(Chemical Engineering—Explanation and Exercise—) (edited by The Society of Chemical Engineers, Japan, new issue, the 20th issue, 2005, p. 35).

[Formula 1]

$$\text{Equivalent radius of a nozzle orifice [mm]} = 2 \times \text{Cross-sectional area of a nozzle orifice [mm}^2\text{]/Peripheral length of a channel [mm]} \quad (1)$$

The cross-sectional area of a nozzle orifice was determined by binarizing a microscope photograph taken from the discharging direction of the nozzle by image analysis.

(4) Melt Viscosity on Discharge (Pa·Sec)

For various raw material compositions used in Examples, samples resulting from cutting unextracted membranes discharged during spinning into about 2 mm long with scissors were used in measurements. A capillograph manufactured by Toyo Seiki Seisaku-sho, Ltd. was used as a measurement instrument, the melt viscosity at six shear rates between 100 $\sec^{-1}$ to 8000 $\sec^{-1}$ was measured at the actual resin temperature on discharge through an outlet, and then representative viscosity m and an exponent n in the exponential equation for viscosity (the Rabinowitsch equation: the following formula (2)) were calculated by the least square method. Subsequently, the melt viscosity at the shear rate on spinning (shown in the following (5)) was calculated.

[Formula 2]

$$\text{Melt viscosity [Pa·sec]} = \text{Representative viscosity } m \text{ [Pa·sec]} \times (\text{Shear rate})^{n-1} \quad (2)$$

(5) Shear Rate (1/Sec)

The shear rate was calculated by the Rabinowitsch correction equation (the following formula (3)) according to Rheology to Die no Design—Riron to Keisan—(Design for Rheology and Die—Theory and Calculation—) (Japan Society of Plastics Processing Technology, p. 60).

[Formula 3]

$$\text{Shear rate [sec}^{-1}\text{]} = (3n+1)/n \times (\text{Discharge amount of fusion kneaded product [mm}^3\text{/sec]}/\pi) \times (\text{Equivalent radius of a nozzle orifice [mm]})^3 \quad (3)$$

The exponent n determined in the above (4) was used as n. The discharge amount of fusion kneaded product [mm$^3$/sec] was determined by actual measurement.

(6) Pressure at the Tip of Outlet [kPa]

Using the equivalent radius of a nozzle orifice calculated in (3) and the melt viscosity calculated in (4), pressure at the tip of an outlet was calculated by the following formula (the Hagen-Poiseuille equation) (edited by The Society of Chemical Engineers, Japan, new issue, the 20th issue, 2005, p. 39).

[Formula 4]

$$\text{Pressure at the tip of an outlet [kPa]} = (8 \times \text{Melt viscosity [Pa·sec]} \times \text{Length } l \text{ of the tip part [mm]} \times \text{Linear speed } V_S \text{ on discharge at an outlet [mm/sec]})/(\text{Equivalent radius of a nozzle orifice [mm]})^2 \times 10^{-3} \quad (4)$$

(7) Draft Ratio

The linear speed VS on discharge of fusion kneaded product as calculated by the following formula (5) using the actually measured discharge amount of fusion kneaded product [mm$^3$/sec] and the cross-sectional area of discharge at an outlet [mm$^2$] determined by image analysis.

[Formula 5]

$$\text{Linear speed } V_S \text{ on discharge at an outlet [mm/sec]} = \text{Discharge amount of fusion kneaded product [mm}^3\text{/sec]/Cross-sectional area of discharge at an outlet [mm}^2\text{]} \quad (5)$$

Next, the draft ratio was calculated by the following formula (6) using the take-up speed VL of a take-up machine and the linear speed VS on discharge.

[Formula 6]

$$\text{Draft ratio} = \text{Take-up speed } V_L \text{ [m/min]/Linear speed } V_S \text{ on discharge at an outlet [m/min]} \quad (6)$$

(8) Presence or Absence of Fiber Diameter Variation, Defect, and Coil

The presence or absence of the occurrence of a fiber diameter variation and a coil was identified by visually observing the air gap and a take-water part at the time of spinning. As for a defect, a hollow fiber-like molded product obtained from spinning was stretched at about 5000 m/minute and at a stretch ratio of 2.5 times to identify the presence or absence of the occurrence of a fiber breakage.

(9) Measurement of Inner Diameter (Mm), Outer Diameter of a Projected Part (Mm), and Outer Diameter of a Depressed Part (Mm), of Deformed Porous Hollow Fiber Membrane These were calculated from the arithmetic mean resulting from the following formulae (7) to (9), by slicing a porous hollow fiber membrane in the direction vertical to the longitudinal direction of the membrane with a razor or the like, and measuring the inner diameter of the cross section, the outer diameter of a projected part, and the outer diameter of a depressed part, using a microscope. The outer diameter of a projected part described herein is the diameter of a concentric circle to the inner diameter, the concentric circle passing through the top of the projected part. The outer diameter of a depressed part is the diameter of a concentric circle passing through the top of the depressed part (a part at which the membrane thickness is the minimum).

[Formula 7]

$$\text{Inner diameter [mm]} = (\text{Longer inner diameter [mm]} + \text{Shorter inner diameter [mm]})/2 \quad (7)$$

[Formula 8]

$$\text{Outer diameter of a depressed part [mm]} = (\text{Longer outer diameter of a depressed part [mm]} + \text{Shorter outer diameter of a depressed part [mm]})/2 \quad (8)$$

[Formula 9]

$$\text{Outer diameter of a projected part [mm]} = (\text{Longer outer diameter of a projected part [mm]} + \text{Shorter outer diameter of a projected part [mm]})/2 \quad (9)$$

(10) Ellipticity of Deformed Porous Hollow Fiber Membrane

The ellipticity was calculated by the following formula (10) using the longer inner diameter and the shorter inner diameter derived from the above (1).

[Formula 10]

$$\text{Ellipticity [-]} = \text{Longer inner diameter [mm]/Shorter inner diameter [mm]} \quad (10)$$

(11) Measurement of the Height H (μm) and the Width W (μm) of Asperity and the Number of Projected and Depressed Parts of Deformed Porous Hollow Fiber Membrane A photograph taken with a scanning electron microscope at any magnification at which the shape of an asperity on the periphery of a cross section of a porous hollow fiber membrane can be distinctly identified was used. In the photograph, a difference between the diameter of a concentric circle to the inner diameter, the concentric circle passing through a part at which the membrane thickness is minimum (generally the top of a depressed part) and the diameter of a concentric circle to the inner diameter, the concentric circle passing through the top of a projected part (a part at which the membrane thickness is maximum) was measured and was referred to as the height of an asperity H. The width of an asperity was defined as the width of a projected part at a point where the height of an asperity H from the minimum membrane-thickness position falls to half. As for the number of projected and depressed parts, an image of an entire cross section of the membrane was taken, and the number of projected and depressed parts was counted by visual observation.

(12) Measurement of Deionized Water Permeability (L/m$^2$/Hr) of Deformed Porous Hollow Fiber Membrane The deionized water permeability was determined by the following formula by sealing one end of a wet hollow fiber membrane of about 10 cm long, placing a needle in the hollow part of the other end, injecting deionized water into the hollow part via the needle at a pressure of 0.1 MPa, and measuring the amount of the deionized water permeated through the outer surface. An effective length of the membrane refers to the net membrane length of the porous hollow fiber membrane excluding the part at which the needle is inserted, and it refers to a circular constant.

[Formula 11]

Deionized water permeability [L/m$^2$/hr]=(60 [minute/hr]×Amount of permeated water [L])/(π×Membrane inner diameter [m]×Effective length of membrane [m]×Measuring time [minute])  (11)

(13) Center-to-Center Distance L [mm], Distance to Projected Part r1 [mm], and Distance to Depressed Part r2 [mm]

First, two microscope (manufactured by KEYENCE CORPORATION, VHX100) photographs of two cross sections of hollow fiber membranes were taken at a magnification at which entire cross sections of the membranes were visible. These two photographs of cross sections of the membranes were stuck to cardboard at the back sides of the photographs, and were cut along the peripheries of the membranes with scissors to be used in place of actual cross sections of the membranes. For the center-to-center distance, the point of intersection of the longer diameter and the shorter diameter among the inner diameters was used as the center point in each cross section of the membrane. The two cross sections of the membranes (the pieces cut out of the photographs) were rotated to determine the arrangement in which the distance between the two center points was the minimum, and subsequently the center-to-center distance was actually measured with a ruler. After that, the measured distance was converted to the actual distance based on the magnifications of the photographs to determine the center-to-center distance L. In addition, on the same photographs, the length r1 from the center point to a projected part (namely, the point on the periphery that was farthest from the center point) and the length r2 from the center point to a depressed part (the point on the periphery that was closest to the center point) were measured.

(14) Pore Ratio of Depressed Part and Projected Part on the Outer Surface of Deformed Porous Hollow Fiber Membrane (%)

Measurement was made by the method described in International Publication No. WO 2001/53213. First, onto a copy of an electron microscope image of the outer surface of the top of a projected part and the bottom of a depressed part that was taken from the direction vertical to the outer surface using a scanning electron microscope at a magnification at which the shape of as many as possible of pores can be distinctly identified, a transparent sheet was overlaid. Then, a pore part was filled in with black using a black pen or the like, and subsequently the transparent sheet was duplicated onto a piece of white paper to distinctly differentiate the pore part as black and a non-pore part as white. After that, the surface pore ratio was determined using commercially available image analyzing software.

(15) Strength at Break (MPa), Elongation at Break (%)

The strength at break and the elongation at break were determined by the following formulae (12) and (13) using the load and the displacement at break obtained by stretching a wet hollow fiber membrane at a chuck distance of 5 cm and a tensile speed of 20 cm/min using an Instron-type tensile tester (manufactured by SHIMADZU CORPORATION, AGS-5D). A cross-sectional area of the membrane was determined by image analysis of a microscope photograph of a cross section of the membrane.

[Formula 12]

Strength at break [MPa]=Load at break [N]/Cross-sectional area of membrane [m$^2$]×10$^{-6}$  (12)

[Formula 13]

Elongation at break [%]=Displacement at break [cm]/5 [cm]×100  (13)

(16) Latex Rejection (%)

Uniform latex of a particle size of 0.208 μm (manufactured by JSR Corporation, trade name: STADEX, solid content of 1% by mass) was 100-fold diluted with a 0.5 mass % SDS (sodium dodecyl sulfate) aqueous solution to prepare a suspension of a latex concentration of 0.01% by mass. A sufficient amount of the latex suspension was placed in a beaker, and was supplied to a wet hollow fiber of an effective length of about 12 cm from its outer surface at a linear speed of 0.1 m/s and at a pressure of 0.03 MPa with a peristaltic pump while discharging permeate through both ends (open to the atmosphere) of the hollow fiber to perform filtration of the latex suspension. The permeate was returned into the beaker to perform the filtration in a fluid closed system. Feed was sampled from the permeate discharged through both ends of the hollow fiber and from the beaker 10 minutes after filtration, and the absorbances at 600 nm were measured using an absorption spectrometer to determine the latex rejection by the following formula (14).

[Formula 14]

Latex rejection [%]=(1−Absorbance of permeate/Absorbance of feed)×100  (14)

(17) Compressive Strength (MPa)

With one end of a wet hollow fiber of about 5 cm long sealed and the other end made to be open to the atmosphere, deionized water at 40° C. was pressurized at the outer surface to discharge permeated water through the end that was open to the atmosphere by dead-end filtration method.

The pressure for pressurization was increased from 0.1 MPa by 0.01 MPa while being held at each pressure for 15 seconds to allow sampling the permeated water discharged through the end that was open to the atmosphere during the 15 seconds. While the hollow part of the hollow fiber does not collapse, the absolute amount of the permeated water (weight) increases as the pressure for pressurization increases and, after the pressure for pressurization exceeds the compressive strength of the hollow fiber, the hollow part collapses and blockage starts to occur, whereby the absolute amount of the permeated water decreases even though the pressure for pressurization increases. The pressure for pressurization at which the absolute amount of the permeated water is the maximum was defined as the compressive strength.

(18) Maximum Pore Size (μm)

Measurement was made according to the measurement method of maximum pore size described in ASTM:F316-86 (also known as the bubble point method). The measurement was performed on a hollow fiber membrane of 5 cm long using ethanol as liquid and compressed air as gas for pressurization, at 25° C. and at a pressure increasing rate of 0.05 atm/second. The maximum pore size was calculated by the following formula (15) using the bubble point pressure obtained.

[Formula 15]

$$\text{Maximum pore size [μm]} = 2860 \times (\text{Surface tension of the liquid used [dynes/cm]})/\text{Bubble point pressure [Pa]} \quad (15)$$

When the liquid used is ethanol, the surface tension at 25° C. is 21.97 dynes/cm. (Edited by The Chemical Society of Japan, Kagaku Binran Kiso Hen (*Handbook of Chemistry Basic Version*), 3rd Revision, pp. II-82, Maruzen Company, Limited, 1984).

(19) Average Pore Size (μm)

Measurement was made according to the measurement method of average pore size described in ASTM:F316-86 (also known as the half-dry method). The measurement was performed on a hollow fiber membrane of 5 cm long using ethanol as liquid and nitrogen as gas for pressurization, at 25° C. and at a pressure increasing rate of 0.01 atm/second. The average pore size was calculated by the following formula (16) using the half-dry average pressure obtained.

[Formula 16]

$$\text{Average pore size [μm]} = 2860 \times (\text{Surface tension of the liquid used [dynes/cm]})/\text{Half-dry pressure [Pa]} \quad (16)$$

(20) Preparation of Pressurized Hollow Fiber Membrane Module

A pressurized hollow fiber membrane module of a membrane surface area of 50 m² was prepared as follows. A plurality of porous hollow fiber membranes were tied in a bundle and then the hollow fiber bundle the hollow parts at the one end part of which were sealed was received in a polysulfone cylindrical module casing of an inner diameter of 150 mm and 2000 mm long. The end part that was sealed was installed only with a bonding jig, and the other end part was provided with 24 in total of polypropylene rods of an outer diameter of 11 mm parallel to the porous hollow fiber membrane and was then installed with a bonding jig liquid tightly.

The module casing installed with the bonding jigs at both sides was subjected to centrifugal casting with a two-pack epoxy resin.

After centrifugal casting, the bonding jigs and the polypropylene rods were removed and, following the epoxy-bonded part being sufficiently cured, the bonded end part that was sealed was cut so as to open the hollow fiber hollow part. Thus, a pressurized hollow fiber membrane module including a hollow fiber membrane bundle was obtained.

(21) Preparation of Negative Pressure Hollow Fiber Membrane Module

A negative pressure hollow fiber membrane module of a membrane surface area of 25 m² was prepared as in the method described in International Publication No. WO 2004/112944.

Namely, both ends of a plurality of porous hollow fiber membranes were adhesively fixed with an urethane resin to prepare a cylindrical hollow fiber membrane module the periphery of one end part of which was provided with a cartridge head fixed liquid tightly and adhesively and the periphery of the other end part of which was provided with a lower ring fixed liquid tightly and adhesively. The effective distance between filtration part interfaces of the adhesively fixed layers on the cartridge head side and the lower ring side was 2000 mm. The diameters of the adhesively fixed layers at both ends of the hollow fiber were about 150 mm. Thus, a negative pressure hollow fiber membrane module was prepared.

(22) Experiment 1 of Measuring Water Permeation Amount of Hollow Fiber Membrane Module (Pressurized)

The hollow fiber membrane module obtained in (20) was used, and river surface stream water of turbidity of 5 to 10 and a water temperature of 18 to 25° C. was used as raw water. As for the water permeation amount, the water permeation amount was increased stepwise in a dead-end filtration mode with external pressure applied with a pump, and the largest water permeation amount at which the pressure difference between membranes did not rapidly increase (not exceeding 10 kPa/week on a 25° C. basis) was measured.

The filtration operation was a cycle operation of filtration/ (backwash and air bubbling). Each cycle was of a filtration/ (backwash and air bubbling) cycle time of 29 minutes/1 minute, the backwash flow rate on backwash was 2.3 L/minute/module, and the flow rate of air on air bubbling was 4.6 NL/minute/module.

(23) Experiment 2 of Measuring Water Permeation Amount of Hollow Fiber Membrane Module (Negative Pressure)

The hollow fiber membrane module obtained in (21) was used and was immersed in an activated sludge tank of a volume of 8 m3. Industrial waste water of BOD of 750 mg/L was used as raw water. The MLSS concentration in the activated sludge was fixed at about 10 g/L. As for the water permeation amount, the water permeation amount was increased stepwise in a dead-end filtration mode with the hollow part of the membrane made to be at negative pressures using a suction pump, and the largest water permeation amount at which the pressure difference between membranes did not rapidly increase (not exceeding 10 kPa/week on a 25° C. basis) was measured.

The filtration operation was a cycle operation of filtration/ backwash while aerating air of an aeration amount for membrane of 6 Nm³/hour at all times. The filtration/backwash cycle time was filtration/backwash: 9 minutes/1 minute, and the backwash flow rate on backwash was the same flow rate as the flow rate on filtration.

(24) Proportion of Projected and Depressed Parts to the Peripheral Length of the Periphery (%)

A photograph taken with a scanning electron microscope at any magnification at which the shape of an asperity on the periphery of a cross section of a porous hollow fiber membrane can be distinctly identified was used. In the photograph, a circumferential part, a depressed part, and a projected part were differentiated, and the proportion of the projected and depressed parts to the peripheral length of the periphery was calculated by the following formula.

[Formula 17]

Proportion of asperity to the peripheral length of the periphery [%]=(Peripheral length of projected part [mm]+Peripheral length of depressed part [mm])/(Peripheral length of projected part [mm]+Peripheral length of depressed part [mm]+Peripheral length of a circumferential part [mm])×100   (17)

[Formula 18]

Fretting resistance [%]=Deionized water permeability after fretting evaluation [L/m$^2$/hr]/Deionized water permeability before fretting evaluation [L/m$^2$/hr]×100   (18)

(26) Retention of the Height of Projected Part after Fretting (%)

The height of a projected part after fretting was measured as in (11) by sampling the membrane used in (25). Subsequently, the retention of the height of a projected part after fretting was calculated by the following formula.

[Formula 19]

Retention of the height of projected part after fretting [%]=Height of a projected part after fretting evaluation [μm]/Height of a projected part before fretting evaluation [μm]×100   (19)

(27) Drying Resistance

Ten hollow fiber membranes of 15 cm long were dried in a dryer at 45° C. for 24 hours, and then the deionized water permeability of the membranes after dried was measured as in (12). Subsequently, the drying resistance was calculated by the following formula.

[Formula 20]

Drying resistance [%]=Deionized water permeability after drying resistance evaluation [L/m$^2$/hr]/ Deionized water permeability before drying resistance evaluation [L/m$^2$/hr]×100   (20)

<Preparation and Evaluation Results in Examples 1 to 31 and Comparative Examples 1 to 5>

[Raw Material]

Materials constituting the hollow fiber membranes in Examples 1 to 31 and Comparative Examples 1 to 5 and hollow fiber membrane modules prepared using the hollow fiber membranes are each selected from the following materials. The material for preparing the hollow fiber membrane according to each Example and Comparative Example and the composition ratio thereof are shown in FIGS. 18 to 21. In FIGS. 18 to 21, each material is shown by a symbol shown below. All the composition ratios thereof are shown by a mass part.

Thermoplastic Resin:
(R-1) Vinylidene fluoride homopolymer (manufactured by KUREHA CORPORATION, trade name: KF#1000)
(R-2) High density polyethylene resin (manufactured by Asahi Kasei Chemicals Corporation, trade name: SH800)

Organic Liquid:
(R-3) Polypropylene resin (manufactured by Tokuyama Corporation, trade name: PN110 G)
(R-4) Cellulose acetate butyrate polymer (Mw=65,000)
(L-1) Di(2-ethylhexyl) phthalate (manufactured by CG ESTER CORPORATION)
(L-2) Dibutyl phthalate (manufactured by CG ESTER CORPORATION)

Inorganic Fine Powder:
(L-3) Triethylene glycol (manufactured by Wako Pure Chemical Industries, Ltd.)
(P-1) Fine silica powder (manufactured by Nippon Aerosil Co., Ltd., trade name: AEROSIL-R972, primary particle size of about 16 nm) Hydrophilic additive:
(P-2) Hydrophilic additive (polyethylene glycol, weight average molecular weight of 35000, manufactured by Merck Ltd.)

Example 1

Melt extrusion was performed by using a vinylidene fluoride homopolymer (manufactured by Kureha Chemicals, trade name: KF#1000) as a thermoplastic resin, a mixture of di(2-ethylhexyl) phthalate and dibutyl phthalate as organic liquid, and a fine silica powder (manufactured by Nippon Aerosil Co., Ltd., trade name: AEROSIL-R972) as inorganic fine powder. Using a fusion kneaded product having composition of a vinylidene fluoride homopolymer:bis(2-ethylhexyl) phthalate:dibutyl phthalate:fine silica powder=34.0: 33.8:6.8:25.4 (mass ratio) as a fusion kneaded product to be discharged and air as hollow part-forming fluid, extrusion was performed at a draft ratio of 2.3 through a hollow fiber-forming nozzle having 16 projected parts of 200 μm high and 400 μm wide on the periphery of the discharging part to obtain a deformed hollow fiber-like molded product.

Figure 11:
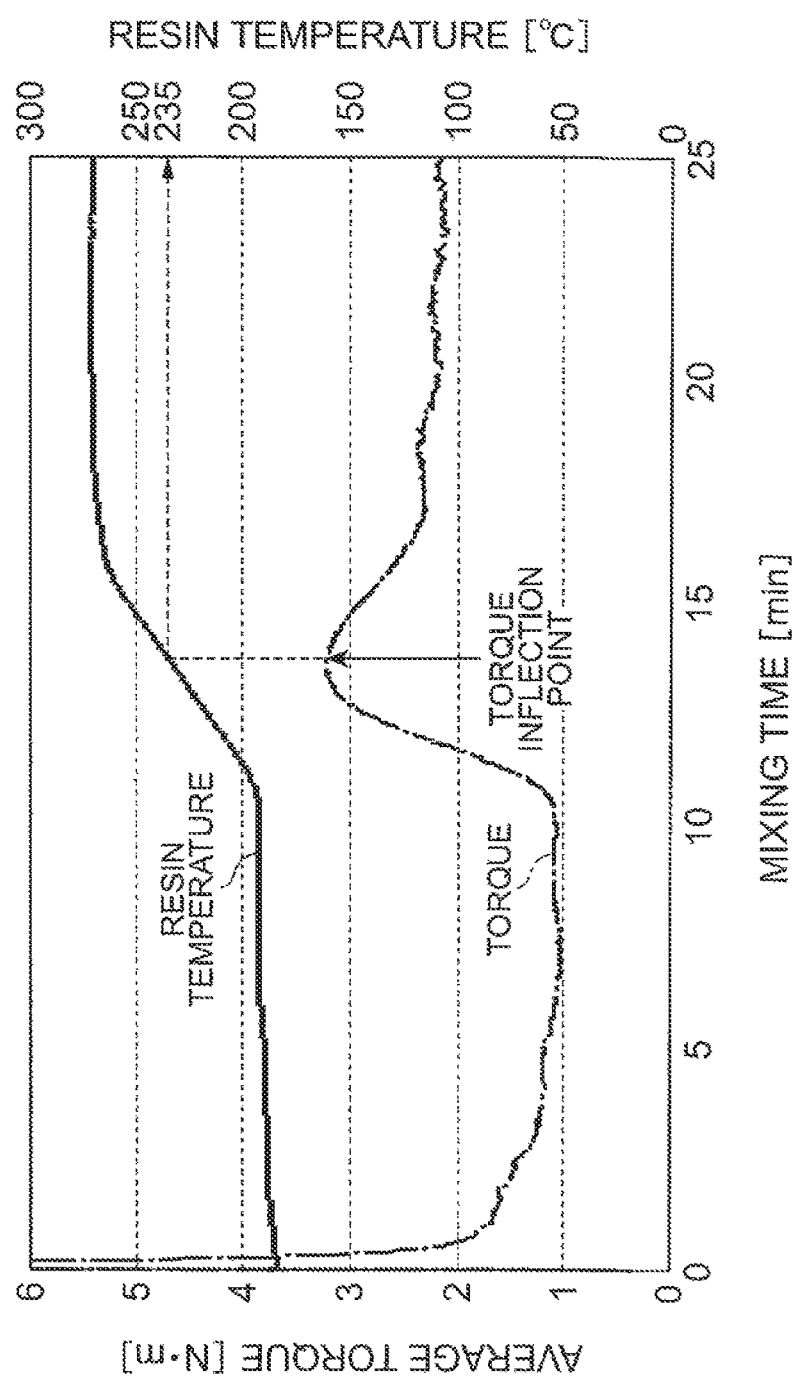
FIG. 11 is a torque curve resulting from measurements with a plastomill of a fusion kneaded product discharged in Example 1.

The resin temperature on discharge of the fusion kneaded product from an extruder was 250° C., and the resin temperature on discharge through an outlet was 245° C. The torque curve resulting from measurement of the discharged fusion kneaded product with a plastomill is shown in FIG. 11. The torque inflection temperature was 235° C.

The hollow fiber-like molded product obtained was made to pass through the air gap for 30 cm while being blown with cooling air from the direction vertical to the discharging direction, and was then introduced into a water bath at 30° C. to be cooled and solidified, followed by being taken up with a reel at a rate of 30 m/minute. The hollow fiber-like extrudate obtained was immersed in methylene chloride for extraction removal of bis(2-ethylhexyl) phthalate and dibutyl phthalate, and was then dried. Subsequently, the hollow fiber membrane was immersed in a 40% by mass aqueous ethanol solution for 30 minutes, and was then immersed in water for 30 minutes to get wet. Subsequently, it was immersed in a 20 mass % NaOH aqueous solution at 70° C. for 1 hour, and was washed with water repeatedly for extraction removal of fine silica powder. Preparation conditions for the hollow fiber membrane are shown in FIG. 18, and evaluation results of various physical properties and performance on actual liquid of the porous hollow fiber membrane obtained are shown in FIG. 22.

Figure 12:
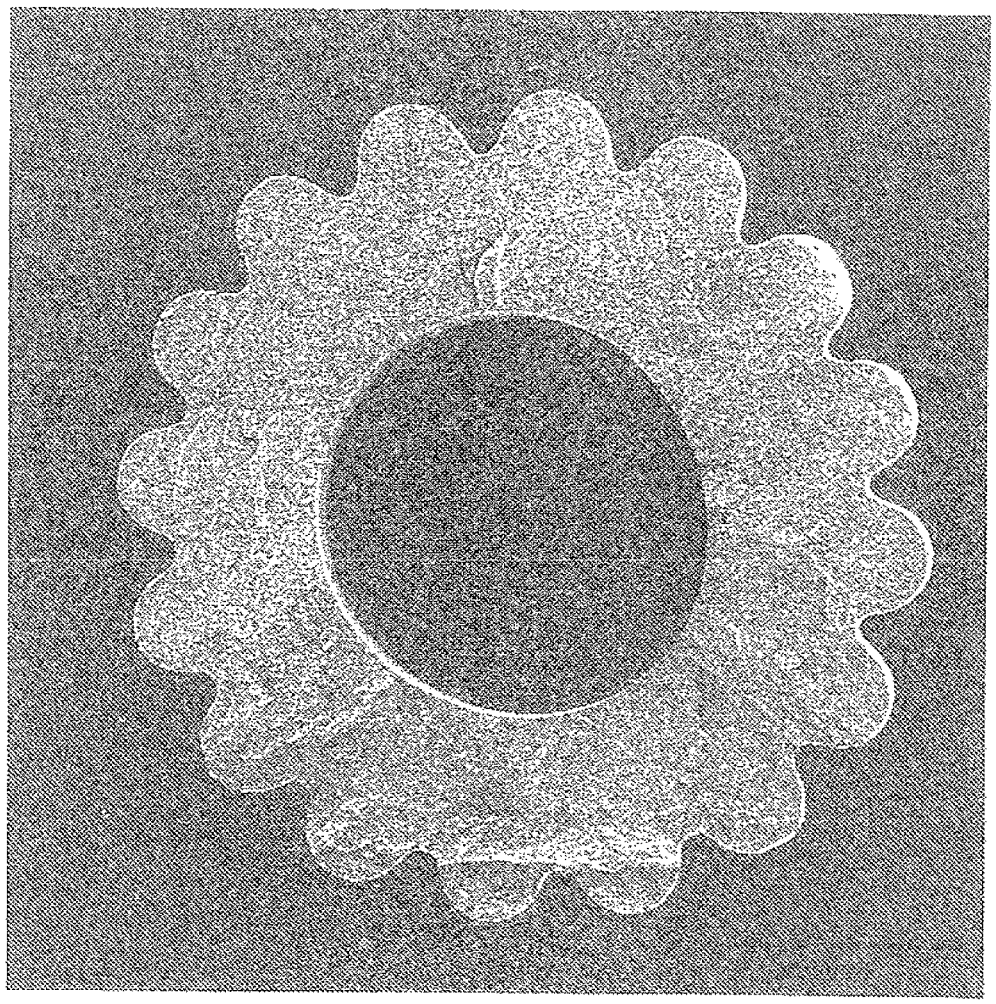
FIG. 12 is an electron microscope photograph of a cross section of a deformed porous hollow fiber membrane obtained in Example 1 at a magnification of 60 times.
Figure 13:
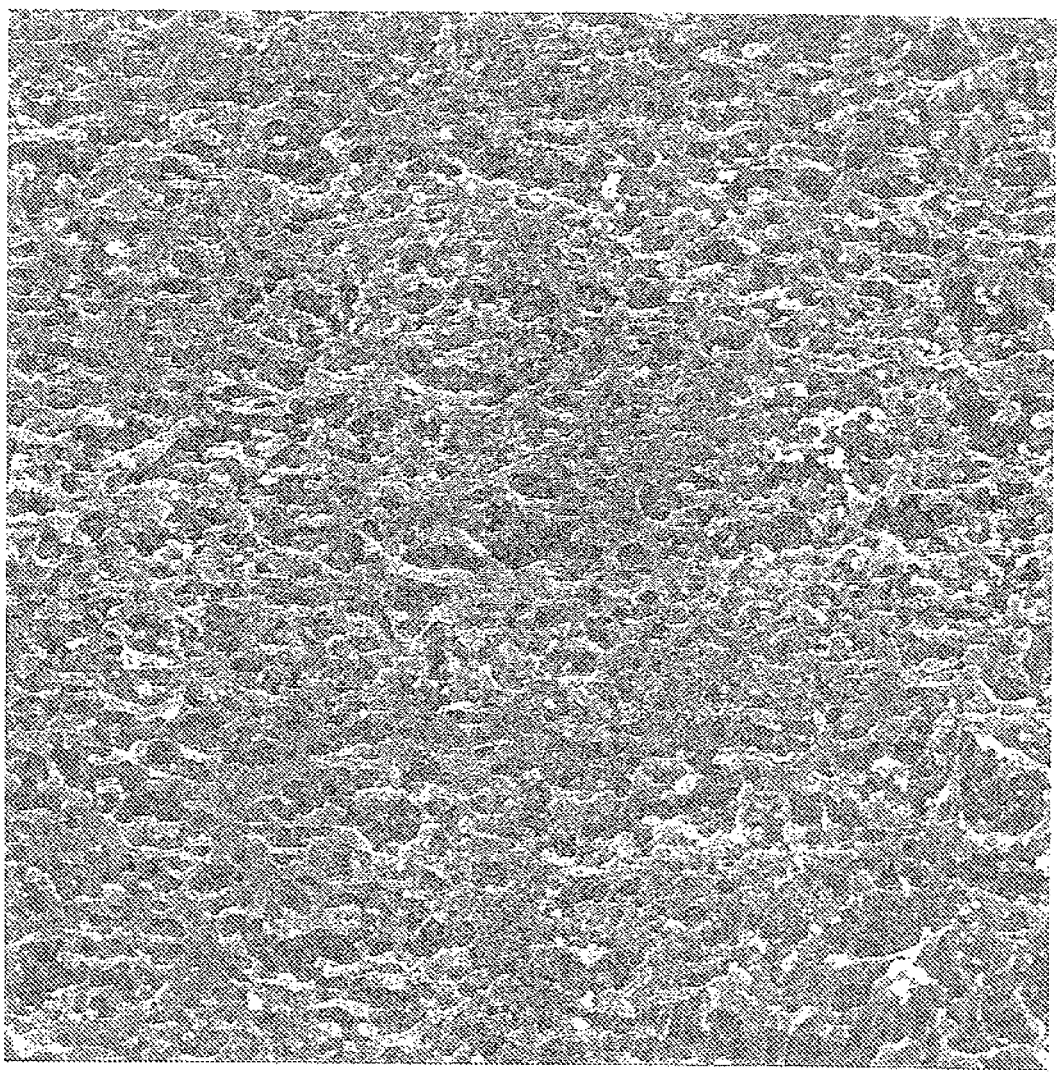
FIG. 13 is an electron microscope photograph of the vicinity of the top of a projected part on the outer surface of the deformed porous hollow fiber membrane obtained in Example 1 at a magnification of 5000 times.
Figure 14:
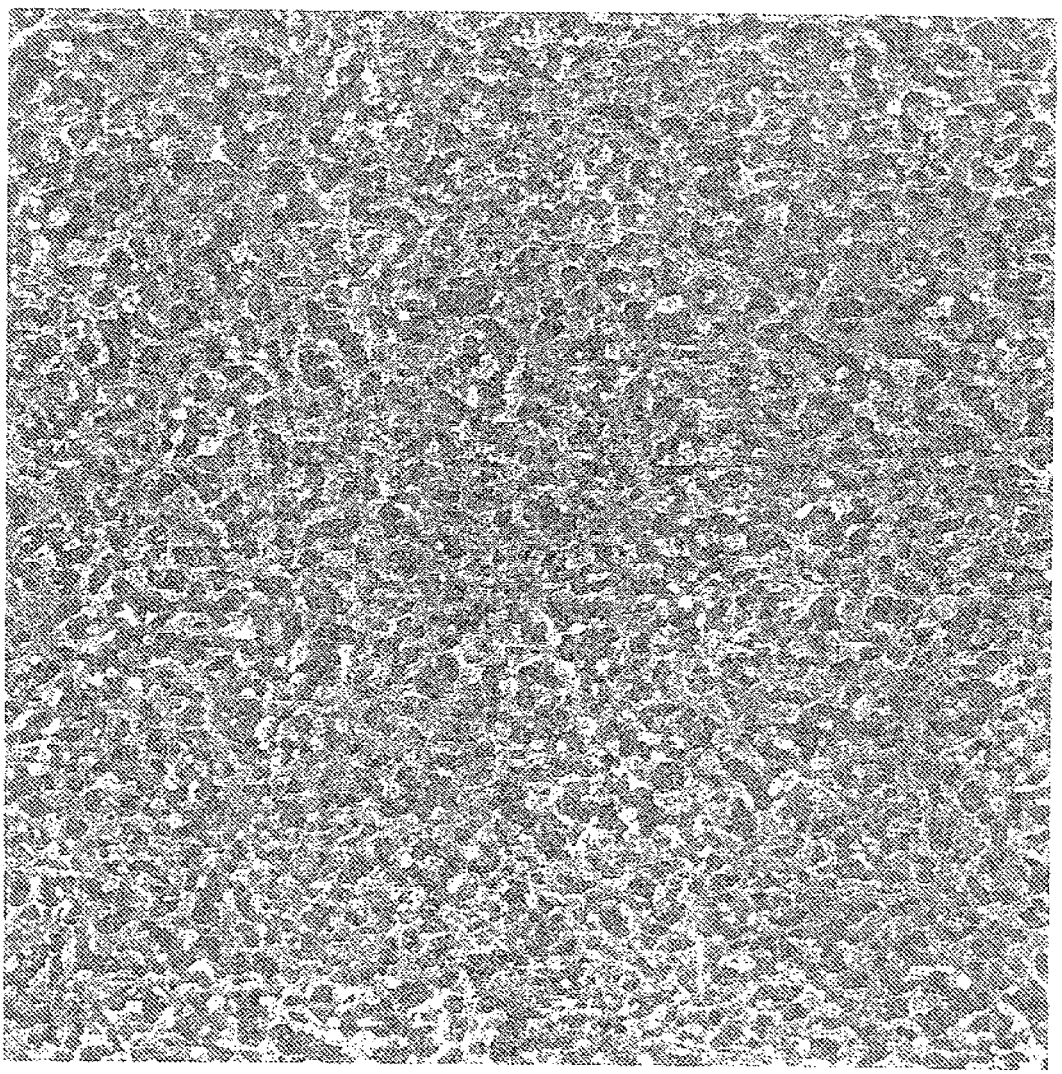
FIG. 14 is an electron microscope photograph of the vicinity of the bottom part of a depressed part on the outer surface of the deformed porous hollow fiber membrane obtained in Example 1 at a magnification of 5000 times.

A scanning electron microscope photograph of a cross section of the porous hollow fiber membrane obtained at a magnification of 60 times is shown in FIG. 12, a scanning electron microscope photograph of the top of a projected part on the outer surface at a magnification of 5000 times is shown in FIG. 13, and a scanning electron microscope photograph of the bottom part of a depressed part at a magnification of 5000 times is shown in FIG. 14. The surface pore rate of depressed part improved apparently compared to that of projected part.

Examples 2 to 9

Porous hollow fiber membranes were prepared as in Example 1 except that the speed on discharge through a hollow fiber-forming nozzle and the take-up speed were changed to modify the pressure at a nozzle tip part. Preparation conditions in Examples 2 to 9 are shown in FIG. 18, and evaluation results of various physical properties and performance on actual liquid of the porous hollow fiber membranes are shown in FIG. 22. When the pressure at a nozzle tip was low, the asperity shape was slightly less likely to be formed compared to Example 1, however, deformed porous hollow fiber membranes provided with asperities were obtained. The depressed parts had high surface pore ratios as in Example 1.

Examples 10 to 14

Porous hollow fiber membranes were prepared as in Example 1 except that the direction of the cooling air within the air gap was 0°, 15°, 30°, 45°, and 60° to the direction parallel to the discharging direction (sucked from above the orifice). Preparation conditions for the hollow fiber membranes are shown in FIG. 19, and evaluation results of various physical properties and performance on actual liquid of the porous hollow fiber membranes obtained are shown in FIG. 23.

Example 15

A porous hollow fiber membrane was prepared as in Example 1 except that the temperature setting of an extruder barrel was modified so as to obtain the resin temperature on discharge from an extruder to be 220° C. Preparation conditions for the hollow fiber membrane are shown in FIG. 19, and evaluation results of various physical properties and performance on actual liquid of the porous hollow fiber membrane obtained are shown in FIG. 23.

Example 16

A porous hollow fiber membrane was prepared as in Example 1 except that the temperature setting of the outlet was modified so as to obtain the resin temperature on discharge through an outlet to be 210° C. Preparation conditions for the hollow fiber membrane are shown in FIG. 19, and evaluation results of various physical properties and performance on actual liquid of the porous hollow fiber membrane obtained are shown in FIG. 23. A fiber breakage due to a defect occurred at a frequency of 2 times/5000 m.

Example 17

A porous hollow fiber membrane was prepared as in Example 1 except that the temperature settings of an extruder barrel and the outlet were modified so as to obtain the resin temperature on discharge from an extruder to be 220° C. and the resin temperature on discharge through an outlet to be 210° C. Preparation conditions for the hollow fiber membrane are shown in FIG. 19, and evaluation results of various physical properties and performance on actual liquid of the porous hollow fiber membrane obtained are shown in FIG. 23. A fiber breakage due to a defect occurred at a frequency of 10 times/5000 m.

Example 18

A porous hollow fiber membrane was prepared as in Example 1 except that the composition of the fusion kneaded product to be discharged was a vinylidene fluoride homopolymer:bis(2-ethylhexyl) phthalate:dibutyl phthalate: fine silica powder=40.0:30.8:6.2:23.0 (mass ratio). Preparation conditions for the hollow fiber membrane are shown in FIG. 19, and evaluation results of various physical properties and performance on actual liquid of the porous hollow fiber membrane obtained are shown in FIG. 23.

Example 19

A porous hollow fiber membrane was obtained as in Example 1 except that a high density polyethylene resin (manufactured by Asahi Kasei Chemicals Corporation, trade name: SH800) was used as the thermoplastic resin, dibutyl phthalate was used as the organic liquid, a polyethylene resin:dibutyl phthalate:fine silica powder=20.0:56.0:24.0 (weight ratio), Te=245° C., and Ts=240° C. were applied, and further the product was taken up with the reel at a rate of 20 m/minute. Tp of the fusion kneaded product was 228° C. Preparation conditions for the hollow fiber membrane are shown in FIG. 20, and evaluation results of various physical properties and performance on actual liquid of the porous hollow fiber membrane obtained are shown in FIG. 24.

Example 20

Both ends of the hollow fiber-like molded product obtained in Example 1 (in a solidified state at which organic liquid and silica fine powder were not removed) of 10 cm long were held by hands to be stretched to a fiber length of 20 cm, and then the both ends were freed of the hands. Subsequently, extraction removal of the plasticizer and the fine silica powder was performed as in Example 1, and then heat treatment was performed at 140° C. for 30 min without fixing both ends of the membrane to obtain a porous hollow fiber membrane. The final fiber length was 12.5 cm (the final stretch ratio was 1.25 times). Preparation conditions for the hollow fiber membrane (the same conditions as in Example 1) are shown in FIG. 20, and evaluation results of various physical properties and performance on actual liquid of the porous hollow fiber membrane obtained are shown in FIG. 24.

Example 21

A two-layer porous hollow fiber membrane was obtained as in Example 1 except that two extruders were used, and a mixture with the composition in Example 1 as an outer layer and a fusion kneaded product of a vinylidene fluoride homopolymer:bis(2-ethylhexyl) phthalate:dibutyl phthalate: fine silica powder=36.0:34.8:5.0:24.2 (mass ratio) as an inner layer were extruded concurrently through the nozzles for coextrusion to obtain a two-layer structure. Preparation conditions for the hollow fiber membrane are shown in FIG. 20, and evaluation results of various physical properties and performance on actual liquid of the porous hollow fiber membrane obtained are shown in FIG. 24.

Examples 22 to 24

Porous hollow fiber membranes were obtained as in Example 1 except that a hollow fiber-forming nozzle having 12, 32, or 64 projected parts of 200 µm high and 400 µm wide on the periphery of the discharging part was used as the hollow fiber-forming nozzle. Preparation conditions for the hollow fiber membranes are shown in FIG. 20, and evaluation results of various physical properties and performance on actual liquid of the porous hollow fiber membranes obtained are shown in FIG. 24.

Examples 25 to 28

Porous hollow fiber membranes were obtained as in Example 1 except that a hollow fiber-forming nozzle having 16 projected parts of 50 µm, 100 µm, 300 µm, or 400 µm high (all of them are of 400 µm wide) on the periphery of the discharging part was used as the hollow fiber-forming nozzle. Preparation conditions for the hollow fiber membranes are shown in FIG. 20 (Examples 25 to 27) and in FIG. 21 (Example 28), and evaluation results of various physical properties and performance on actual liquid of the porous hollow fiber membranes obtained are shown in FIG. 24 (Examples 25 to 27) and in FIG. 25 (Example 28).

Example 29

A porous hollow fiber membrane was obtained as in Example 1 except that a cellulose acetate butyrate polymer (Mw=65,000) as the thermoplastic resin and triethylene glycol (manufactured by Wako Pure Chemical Industries, Ltd.) as the organic liquid were used. Preparation conditions for the hollow fiber membrane are shown in FIG. 21, and evaluation results of various physical properties and performance on actual liquid of the porous hollow fiber membrane obtained are shown in FIG. 25.

Example 30

A porous hollow fiber membrane was obtained as in Example 1 except that a polypropylene resin (manufactured by Tokuyama Corporation, trade name: PN110 G) as the thermoplastic resin and dibutyl phthalate (manufactured by CG ESTER CORPORATION) as the organic liquid were used. Preparation conditions for the hollow fiber membrane are shown in FIG. 21, and evaluation results of various physical properties and performance on actual liquid of the porous hollow fiber membrane obtained are shown in FIG. 25.

Example 31

A porous hollow fiber membrane was obtained as in Example 1 except that a hollow fiber-forming nozzle having an outer diameter of 2.3 mm and an inner diameter of 1.3 mm of the depressed part and 20 projected parts of 200 µm high and 400 µm wide on the periphery of the discharging part was used as the hollow fiber-forming nozzle, and further the product was taken up with the reel at a rate of 45 m/minute. Preparation conditions for the hollow fiber membrane are shown in FIG. 21, and evaluation results of various physical properties and performance on actual liquid of the porous hollow fiber membrane obtained are shown in FIG. 25.

Comparative Example 1

A porous hollow fiber membrane was obtained as in Example 1 except that the composition of the fusion kneaded product to be extruded was a vinylidene fluoride homopolymer:bis(2-ethylhexyl) phthalate:dibutyl phthalate=34.0:46.0:20.0 (mass ratio), the passing through time at the air gap was 0.01 seconds (the air gap distance was 5 mm), and further Te=240° C. and Ts=230° C. were applied. Tp of the fusion kneaded product was 210° C. This fusion kneaded product containing no silica was a porous hollow fiber membrane in which asperities were likely to disappear right after discharge through an outlet to make spinning difficult and further the ellipticity of which was high. In addition, the water permeation amounts of actual liquid in (22) and (23) were low. Preparation conditions for the hollow fiber membrane are shown in FIG. 21, and evaluation results of various physical properties and performance on actual liquid of the porous hollow fiber membrane obtained are shown in FIG. 25.

Comparative Example 2

A porous hollow fiber membrane was prepared as in Comparative Example 1 except that the passing through time at the air gap was 0.60 seconds. The porous hollow fiber membrane obtained was a porous hollow fiber membrane the asperities of which disappeared and the periphery of which was circular. Preparation conditions for the hollow fiber membrane are shown in FIG. 21, and evaluation results of various physical properties and performance on actual liquid of the porous hollow fiber membrane obtained are shown in FIG. 25.

Comparative Example 3

Figure 15:
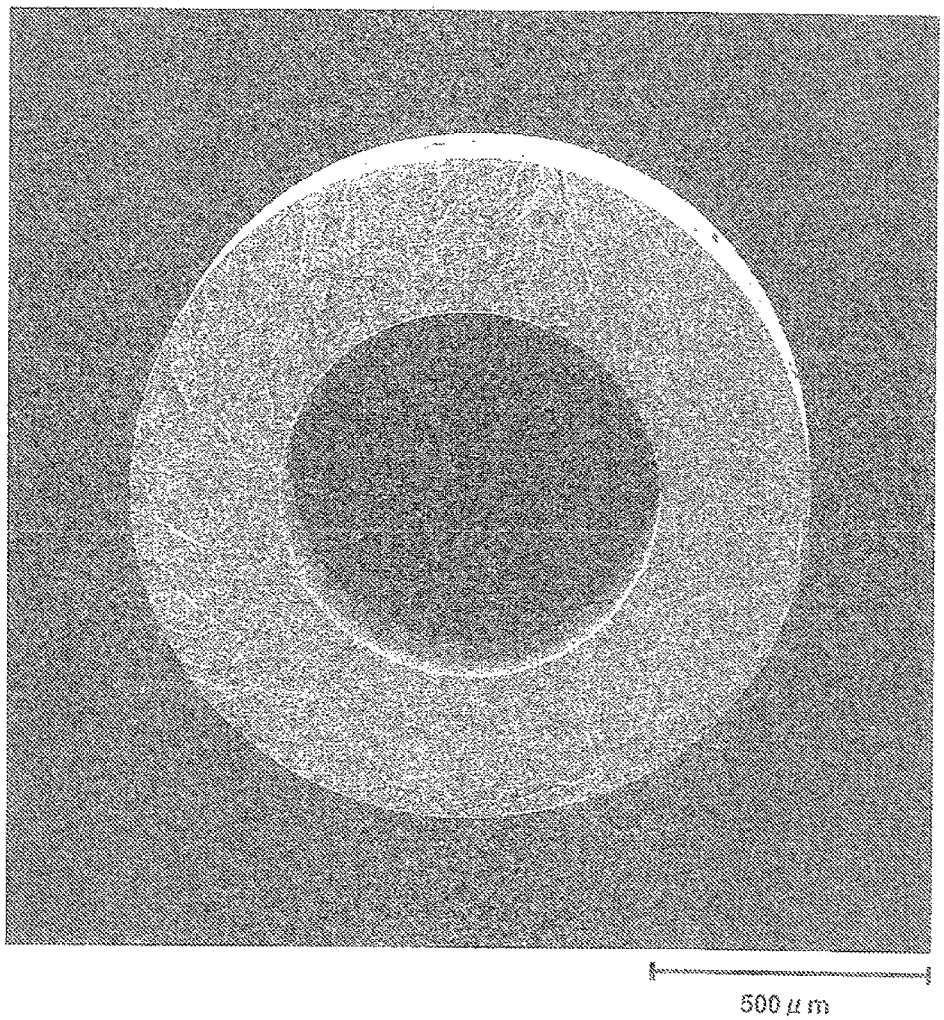
FIG. 15 is an electron microscope photograph of a cross section of a porous hollow fiber membrane obtained in Comparative Example 3 at a magnification of 60 times.
Figure 16:
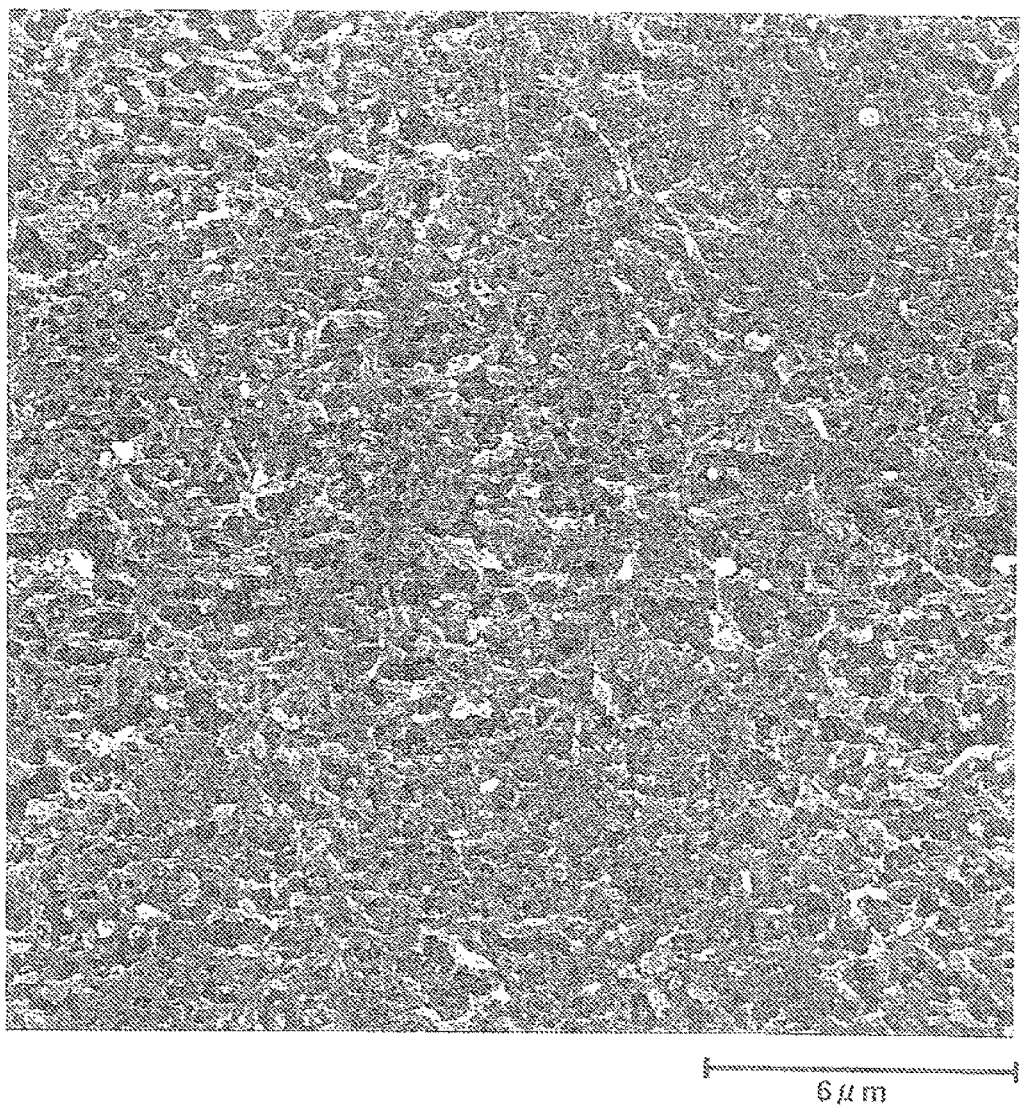
FIG. 16 is an electron microscope photograph of the outer surface of the deformed porous hollow fiber membrane obtained in Comparative Example 3 at a magnification of 5000 times.

A porous hollow fiber membrane was obtained as in Example 1 except that an annular nozzle the periphery of which was circular with no asperities was used as the hollow fiber-forming nozzle. Preparation conditions for the hollow fiber membrane are shown in FIG. 21, and evaluation results of various physical properties and performance on actual liquid of the porous hollow fiber membrane obtained are shown in FIG. 25. An electron microscope photograph of a cross section of the porous hollow fiber membrane obtained at a magnification of 60 times is shown in FIG. 15, and an electron microscope photograph of the outer surface at a magnification of 5000 times is shown in FIG. 16.

Comparative Example 4

Using polyethylene glycol of a weight average molecular weight of 35000 (manufactured by Merck Ltd.) as the hydrophilic additive and dimethylacetamide (manufactured by KISHIDA CHEMICAL Co., Ltd.) as the organic liquid, a vinylidene fluoride homopolymer:dimethylacetamide: polyethylene glycol=27:57.5:15.5 (mass ratio) was dissolved at 70° C. The dissolved product was discharged together with a 90% by mass aqueous solution of dimethylacetamide as the hollow part-forming fluid at a resin temperature of 70° C., flowed an the air gap distance of 3 mm, was then immersed in a water bath at 80° C. for solidification, and was taken up at a rate of 30 m/min to obtain a porous hollow fiber membrane derived from non-solvent induced phase separation. When the air gap distance exceeded 3 mm, the projected parts disappeared to provide an ordinary annular product. The porous hollow fiber membrane obtained was of an asymmetrical structure that had a dense skin layer in the outer surface part and a void in the cross section. Specifically, the asperities were likely to disappear right after discharge through an outlet to make spinning difficult, and the membrane obtained was a porous hollow fiber membrane on the periphery of which asperities were not uniform. Preparation conditions for the hollow fiber membrane are shown in FIG. 21, and evaluation results of various physical properties and performance on actual liquid of the porous hollow fiber membrane obtained are shown in FIG. 25. In the tables, the outer diameter of projected part was resulting from doubling the distance from the center to the top of a projected part, the outer diameter of depressed part was resulting from doubling the distance from the center to the point at which the membrane thickness is minimum, and the asperity height was a height of a protrusion having the highest projected part.

Comparative Example 5

Figure 17:
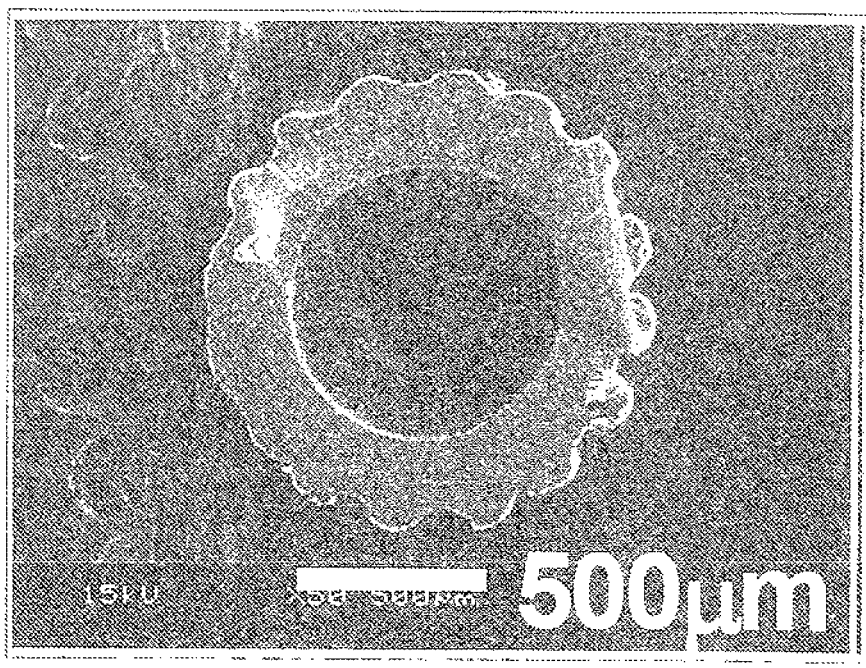
FIG. 17 is an electron microscope photograph of a cross section of a deformed porous hollow fiber membrane obtained in Comparative Example 5 at a magnification of 60 times.

A porous hollow fiber membrane was obtained as in Example 1 except that, with reference to Example 1 in Japanese Patent Application No. 2009-033866 specification (TIPS2-A disclosed in SCEJ 74th Annual Meeting (Yokohama, 2009) E122), the composition of the fusion kneaded product to be extruded was a cellulose acetate butyrate polymer:triethylene glycol=20.0:80.0 (mass ratio), the passing through time at the air gap was 0.01 seconds (the air gap distance was 5 mm), and further Te=170° C. and Ts=170° C. were applied. The asperities were likely to disappear right after discharge through an outlet to make spinning difficult, and the membrane obtained was a porous hollow fiber membrane on the periphery of which asperities were not uniform. A scanning electron microscope photograph of a cross section of the porous hollow fiber membrane obtained at a magnification of 60 times is shown in FIG. 17. The water permeation amounts of actual liquid in (22) and (23) were low. Preparation conditions for the hollow fiber membrane are shown in FIG. 21, and evaluation results of various physical properties and performance on actual liquid of the porous hollow fiber membrane obtained are shown in FIG. 25. In the tables, the outer diameter of projected part was resulting from doubling the distance from the center to the top of a projected part, the outer diameter of depressed part was resulting from doubling the distance from the center to the point at which the membrane thickness is minimum, and the asperity height was a height of a protrusion having the highest projected part.

INDUSTRIAL APPLICABILITY

According to the present invention, it is possible to obtain a deformed porous hollow fiber membrane that is suitable for treatment of liquid containing an inorganic substance and/or an organic substance, and has high water permeability performance, fretting resistance, and drying resistance, a production method of the deformed porous hollow fiber membrane, and a module, a filtration device, and a water treatment method in which the deformed porous hollow fiber membrane is used. The present invention has industrial applicability in a field of water treatment.

REFERENCE SIGNS LIST

1 . . . deformed porous hollow fiber membrane, 2 . . . aperture, 3 . . . asperity, 3A . . . projected part, 3B . . . depressed part, 10 . . . hollow fiber membrane producing device

What is claimed is:

1. A production method of a deformed porous hollow fiber membrane by thermally induced phase separation, the production method comprising:

discharging a fusion kneaded product containing a thermoplastic resin and an organic liquid through an orifice of a hollow fiber-forming deformed nozzle, wherein the method comprises inhibiting misshaping of an asperity shape of the fusion kneaded product when exposed in an air gap after being discharged by adding an inorganic fine powder to the fusion kneaded product;

cooling and solidifying the fusion kneaded product discharged through the deformed nozzle to form the product into a hollow fiber-like material having a deformed cross section at a cross section vertical to a discharging direction; and extracting away the organic liquid from the hollow fiber-like material to obtain the deformed porous hollow fiber membrane, wherein the fusion kneaded product passes through the air gap after being discharged through the deformed nozzle and before being cooled and solidified, and in the air gap, air is blown onto the fusion kneaded product at a certain angle relative to a pass through direction of the fusion kneaded product, the air being blown in a direction that is not parallel to the pass through direction.

2. The production method of a deformed porous hollow fiber membrane according to claim 1, wherein a shape of the deformed nozzle at a side for forming a periphery of the hollow fiber-like material is formed with a plurality of depressed parts and projected parts being alternately and circumferentially arranged.

3. The production method of a deformed porous hollow fiber membrane according to claim 1, wherein a continuous protrusion part is provided on the periphery of the hollow fiber-like material and of the porous hollow fiber membrane in a longitudinal direction of the membrane.

4. The production method of a deformed porous hollow fiber membrane according to claim 1, wherein a pressure at an outlet on discharge of the fusion kneaded product is not lower than 100 kPa and not higher than 900 kPa.

5. The production method of a deformed porous hollow fiber membrane according to claim 1, wherein the thermoplastic resin is composed of polyvinylidene fluoride, a polyolefin, and a blend of polyvinylidene fluoride and a polyolefin.

6. The production method of a deformed porous hollow fiber membrane according to claim 1, wherein the thermoplastic resin is hydrophobic.

7. The production method of a deformed porous hollow fiber membrane according to claim 1, wherein both of a resin temperature at the time of supplying the fusion kneaded product from an extruder toward the deformed nozzle and a resin temperature at the time of discharging the product through the orifice are higher than a torque inflection temperature of the fusion kneaded product.

8. The production method of a deformed porous hollow fiber membrane according to claim 1, wherein the inorganic fine powder in the fusion kneaded product has a mass ratio of no lower than 5% by mass and no higher than 40% by mass.

9. The production method of a deformed porous hollow fiber membrane according to claim 1, wherein the fusion kneading product has a ratio of volume that is obtained by dividing mass by specific gravity, within the range of 15% by volume to 50% by volume for the thermoplastic resin and within the range of 50% by volume to 85% by volume for the total of the organic liquid and the inorganic fine powder.

10. The production method of a deformed porous hollow fiber membrane according to claim 1, wherein the viscosity of the fusion kneaded product discharged is within the range of 1 Pa·sec to 1000 Pa·sec.

11. The production method of a deformed porous hollow fiber membrane according to claim 1, wherein the viscosity of the fusion kneaded product discharged is within the range of 2 Pa·sec to 800 Pa·sec.

12. The production method of a deformed porous hollow fiber membrane according to claim 1, wherein the viscosity of the fusion kneaded product discharged is within the range of 5 Pa·sec to 600 Pa·sec.

13. The production method of a deformed porous hollow fiber membrane according to claim 1, wherein the certain angle is from 15 to 90 degrees.

14. The production method of a deformed porous hollow fiber membrane according to claim 13, wherein the certain angle is from 45 to 90 degrees.

15. The production method of a deformed porous hollow fiber membrane according to claim 14, wherein the certain angle is from 60 to 90 degrees.

\* \* \* \* \*